(12) United States Patent
Yamamoto et al.

(10) Patent No.: US 12,169,653 B2
(45) Date of Patent: Dec. 17, 2024

(54) LIQUID DISCHARGE SYSTEM

(71) Applicant: SEIKO EPSON CORPORATION, Tokyo (JP)

(72) Inventors: Takao Yamamoto, Matsumoto (JP); Shunya Fukuda, Azumino (JP); Yuki Hanamura, Azumino (JP); Nobuaki Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 242 days.

(21) Appl. No.: 18/047,169

(22) Filed: Oct. 17, 2022

(65) Prior Publication Data
US 2023/0122325 A1    Apr. 20, 2023

(30) Foreign Application Priority Data
Oct. 18, 2021    (JP) ................... 2021-170438

(51) Int. Cl.
*G06K 15/00* (2006.01)
*B41J 29/38* (2006.01)
*G06F 3/12* (2006.01)
*H04L 67/12* (2022.01)

(52) U.S. Cl.
CPC .......... *G06F 3/1231* (2013.01); *B41J 29/38* (2013.01); *G06F 3/1203* (2013.01); *G06F 3/1229* (2013.01); *G06F 3/1285* (2013.01); *G06F 3/1297* (2013.01); *H04L 67/12* (2013.01)

(58) Field of Classification Search
CPC .... G06F 3/1231; G06F 3/1203; G06F 3/1229; G06F 3/1285; G06F 3/1297; B41J 29/38; H04L 67/12
See application file for complete search history.

(56) References Cited

U.S. PATENT DOCUMENTS

| | | | | |
|---|---|---|---|---|
| 2002/0131784 A1* | 9/2002 | Takemoto | .......... | G03G 15/5075 399/12 |
| 2004/0252150 A1* | 12/2004 | Iwata | .................... | G06F 3/1284 347/19 |
| 2006/0224889 A1* | 10/2006 | Adkins | ................. | H04L 9/3242 713/168 |
| 2008/0316509 A1* | 12/2008 | Kuwahara | .............. | H04N 1/603 358/1.8 |
| 2021/0060939 A1* | 3/2021 | Kanegae | ................ | B41J 2/2103 |

FOREIGN PATENT DOCUMENTS

JP    2021-030689 A    3/2021

* cited by examiner

Primary Examiner — Moustapha Diaby
(74) Attorney, Agent, or Firm — WORKMAN NYDEGGER

(57) ABSTRACT

A first acquisition section that acquires first information unique to the liquid discharge head and second information related to the liquid discharge device is included. A determination section that determines whether or not correspondence relationship between the first information and the second information is stored in the server in advance is included in the server. A second transmission section that transmits third information related to a determination result of the determination section from the server is included. A second reception section that receives the third information is included. A first notification section that makes, based on the third information, a first notification to outside is included.

20 Claims, 29 Drawing Sheets

FIG. 5

| FIRST INFORMATION D1 | SECOND INFORMATION D2 | CORRESPONDENCE INFORMATION CD1 | | DETERMINATION RESULT (THIRD INFORMATION D3) |
|---|---|---|---|---|
| | | S/N | MANUFACTURER | |
| 0001 | 0001 | 0001 | 0001 | OK |
| 0002 | 0001 | 0002 | 0001 | OK |
| 0003 | 0002 | 0003 | 0001 | NG |
| 0004 | 0001 | 0004 | 0001 | OK |
| 0005 | 0001 | 0005 | 0001 | OK |
| 0006 | 0002 | 0006 | 0002 | OK |
| 0007 | 0002 | 0007 | 0002 | OK |
| 0008 | 0002 | 0008 | 0002 | OK |
| 0009 | 0008 | 0009 | 0001 | NG |
| 0010 | 0001 | 0010 | 0001 | OK |
| 0001 | 0001 | 0001 | 0001 | NG |

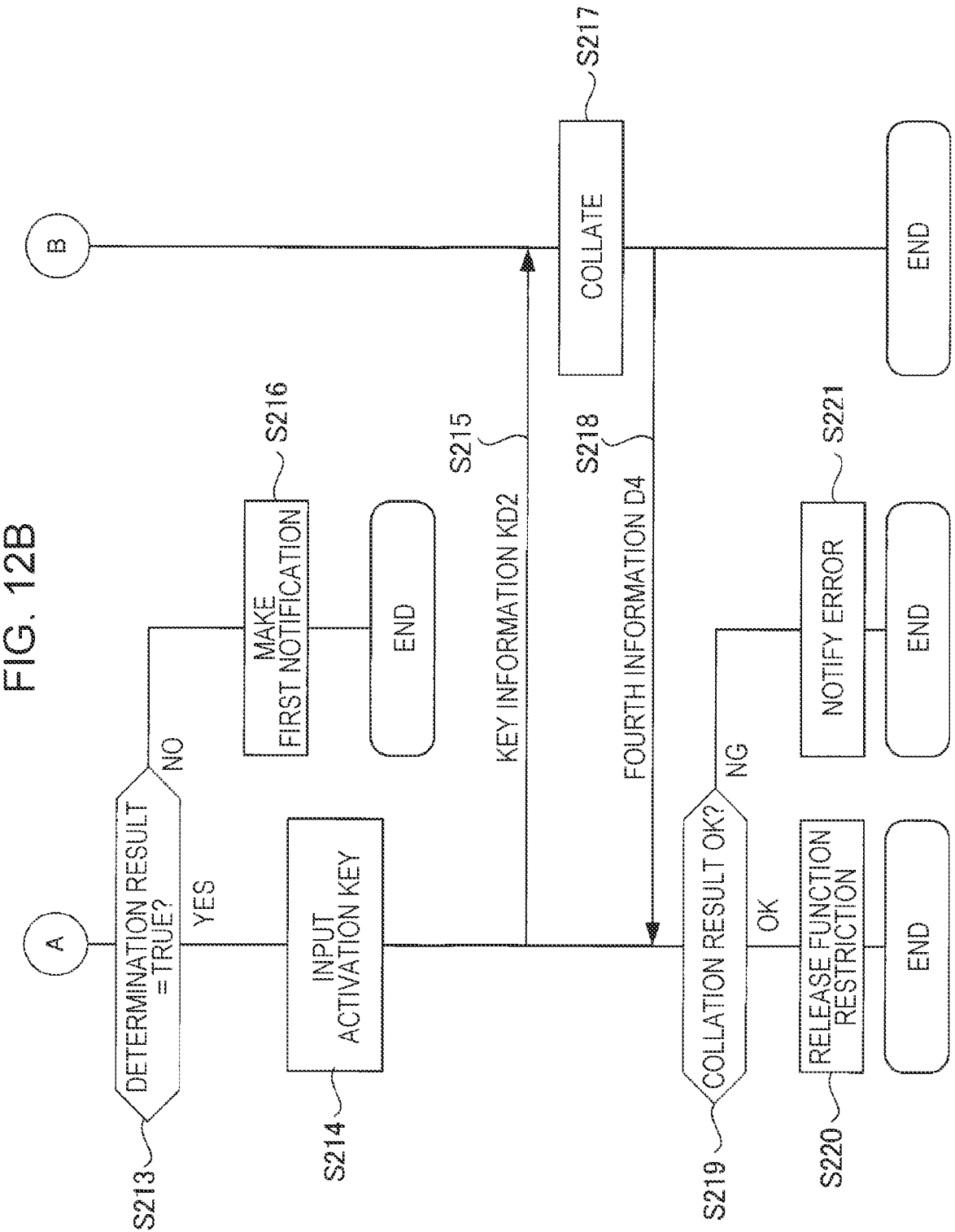

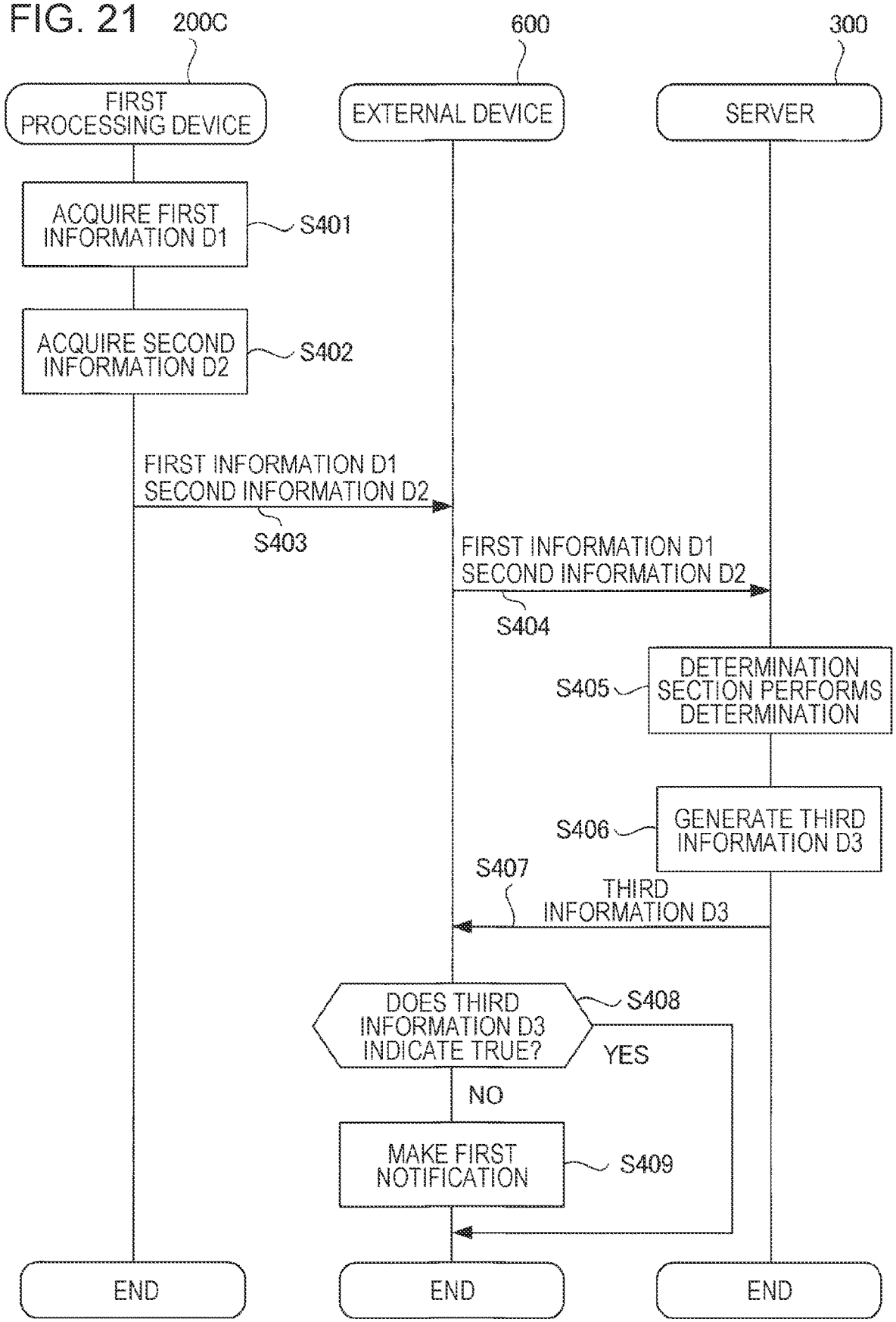

LIQUID DISCHARGE SYSTEM

The present application is based on, and claims priority from JP Application Serial Number 2021-170438, filed Oct. 18, 2021, the disclosure of which is hereby incorporated by reference herein in its entirety.

BACKGROUND

1. Technical Field

The present disclosure relates to a liquid discharge system.

2. Related Art

In a liquid discharge device such as an ink jet-type printer, for example, as disclosed in JP-A-2021-30689, a liquid such as ink is discharged from a head by applying a drive pulse to a drive element such as a piezoelectric element.

In recent business models, there is a case where the manufacturer of a head is different from the manufacturer of a printer main body, which is an element excluding the head among elements constituting a printer. The manufacturer of the head has different parameters, such as piezoelectric characteristics, liquid flow paths, nozzles, and the like for each purpose of the printer. However, the manufacturer of the printer main body may manufacture the printer using a head different from the head, which is originally supposed to be used, due to cost, inventory, and the like. In the printer, for example, there may be a problem that the liquid discharge characteristics are not sufficient. In the related art, it is difficult to grasp in advance the use of a head which is not a regular product for the printer main body until the problem actually manifested by the end user of the printer actually using the printer.

SUMMARY

According to an aspect of the present disclosure, there is provided a liquid discharge system, which includes a liquid discharge head that discharges a liquid, a liquid discharge device on which the liquid discharge head is mounted, a first processing device that is coupled to the liquid discharge device and generates recording data used to perform a discharge operation of the liquid discharge head in the liquid discharge device, and a server that is configured to be connected to a network, in which a first acquisition section that acquires first information unique to the liquid discharge head and second information related to the liquid discharge device is included, a first transmission section that transmits the first information and the second information, which are acquired by the first acquisition section, to the server via network connection is included, a first reception section that receives the first information and the second information via network connection is included in the server, a determination section that determines whether or not correspondence relationship between the first information and the second information is stored in the server in advance is included in the server, a second transmission section that transmits third information related to a determination result of the determination section from the server via network connection is included, a second reception section that receives the third information via network connection is included, and a first notification section that makes, based on the third information received by the second reception section, a first notification to outside is included.

BRIEF DESCRIPTION OF THE DRAWINGS

FIG. 5 is a look-up table showing an example of a set of first information and second information, correspondence information, and third information.

FIG. 12B is a flowchart showing the process of the liquid discharge system according to the second embodiment.

FIG. 21 is a flowchart showing a process of the liquid discharge system according to the fourth embodiment.

DESCRIPTION OF EXEMPLARY EMBODIMENTS

Figure 1:
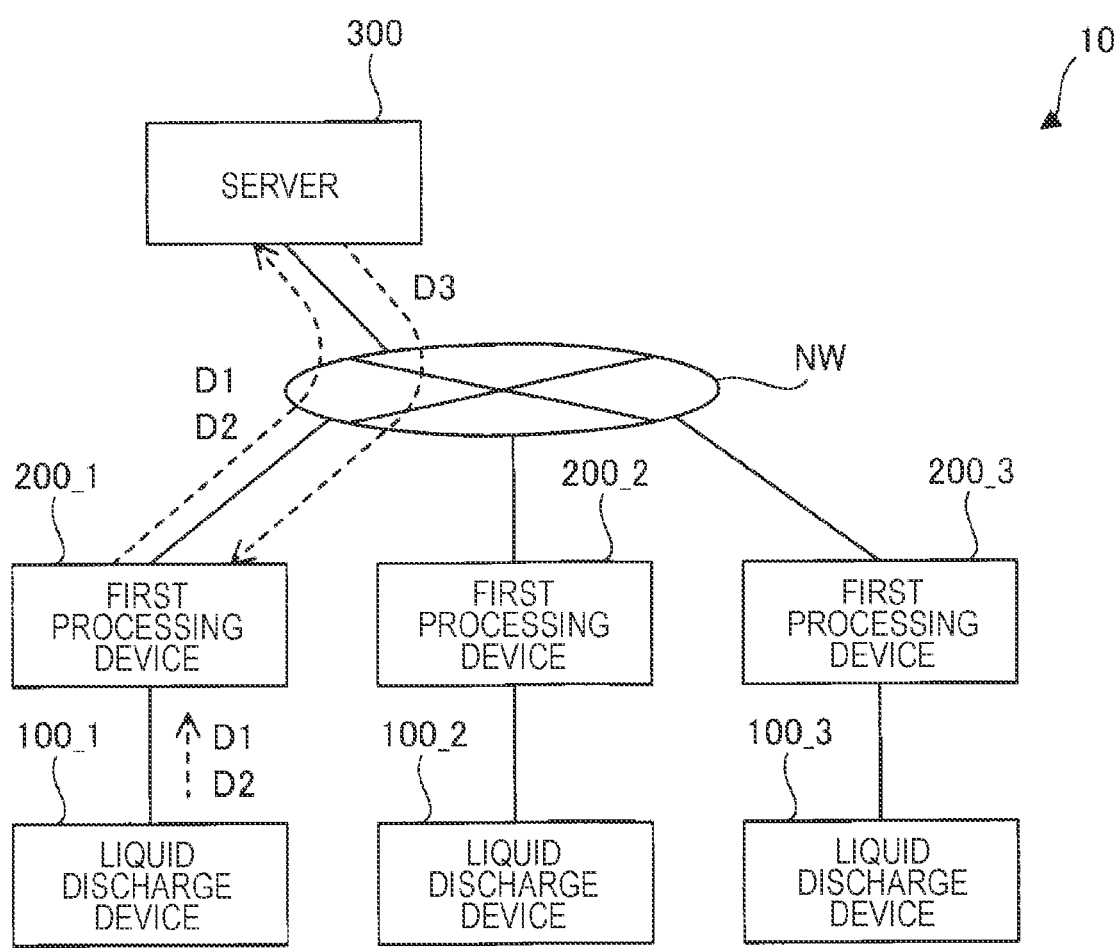
FIG. 1 is a schematic diagram showing a configuration example of a liquid discharge system according to a first embodiment.

Hereinafter, preferred embodiments according to the present disclosure will be described with reference to the accompanying drawings. In the drawings, the dimension and scale of each section are appropriately different from the actual ones, and some parts are schematically shown for easy understanding. Further, the scope of the present disclosure is not limited to the forms unless being described that the present disclosure is particularly limited in the following description.

1. First Embodiment 1-1. Outline of Liquid Discharge System

FIG. 1 is a schematic diagram showing a configuration example of a liquid discharge system 10 according to a first embodiment. The liquid discharge system 10 is a system for grasping the use of a head, which is not a regular product, for the printer main body. Here, the "printer main body" means a configuration in which a head is excluded from the printer. In the example shown in FIG. 1, the liquid discharge system 10 includes liquid discharge devices 100_1 to 100_3, first processing devices 200_1 to 200_3, and a server 300. In the following, the liquid discharge devices 100_1 to 100_3 are collectively referred to as a "liquid discharge device 100". Similarly, the first processing devices 200_1 to 200_3 are collectively referred to as a "first processing device 200".

Here, the liquid discharge devices 100_1 to 100_3 are provided by the manufacturer of the printer main body (described later). Each of the liquid discharge devices 100_1 to 100_3 may be provided by the same manufacturer or may be provided by different manufacturers. The first processing devices 200_1 to 200_3 may be owned by a user or may be provided by the manufacturer of the printer main body. On the other hand, a head unit 110 incorporated in the liquid discharge devices 100_1 to 100_3 is provided by the manufacturer of the head (described later). The server 300 is maintained and managed by the manufacturer of the head.

When the user uses the printer main body, the user owns the liquid discharge device 100_1, the first processing device 200_1, and the head unit 110. On the other hand, although the user does not own the server 300, the user can communicate with (be connected to) the server 300 via a communication network (described later) NW.

The user indicates a person who uses the liquid discharge device 100_1. For example, when the manufacturer of the printer main body who purchases the head from the manufacturer of the head and manufactures the printer main body uses the printer main body, the manufacturer of the printer main body becomes the user. Further, for example, when the manufacturer of the printer main body purchases the head from a manufacturer of the head and manufactures the printer main body, and a third party purchases the printer main body from the manufacturer of the printer main body and uses the printer main body, the third party becomes a user.

The liquid discharge devices 100_1 to 100_3 and the first processing devices 200_1 to 200_3 have one-to-one correspondence with each other. In addition, in FIG. 1, three liquid discharge devices 100_1 to 100_3 and three first processing devices 200_1 to 200_3 are described, but this is an example. The liquid discharge system 10 has any number of sets of the liquid discharge device 100 and the first processing device 200.

In the liquid discharge system 10, the first processing device 200 is connected to each of the liquid discharge device 100 and the server 300 so as to be communicable with each other in a wireless or wired manner. The first processing device 200 is connected to the server 300 via a communication network NW including the Internet. The communication network including the Internet may intervene in the connection between the first processing device 200 and the liquid discharge device 100.

Further, as shown in FIG. 1, first information D1 and second information D2 are transmitted from the liquid discharge device 100 to the first processing device 200. Further, the first information D1 and the second information D2 are transmitted from the first processing device 200 to the server 300. On the other hand, third information D3 is transmitted from the server 300 to the first processing device 200. Details of the first information D1, the second information D2, and the third information D3 will be described later based on FIGS. 2 and 3.

1-2. Configuration of Liquid Discharge Device

Figure 2:
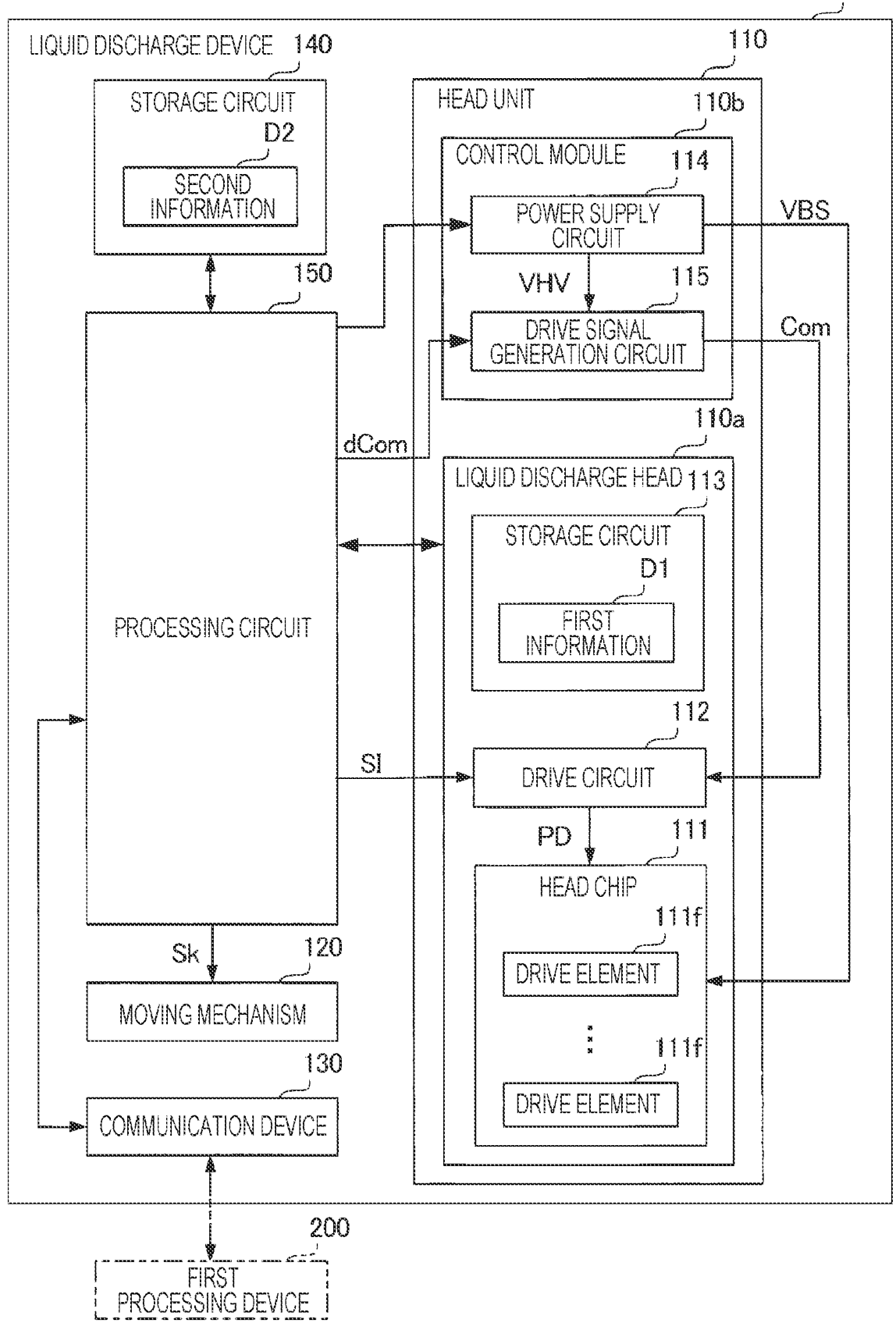
FIG. 2 is a schematic diagram showing a configuration example of a liquid discharge device used in the liquid discharge system according to the first embodiment.

FIG. 2 is a schematic diagram showing a configuration example of the liquid discharge device 100 used in the liquid discharge system 10 according to the first embodiment. The liquid discharge device 100 is a printer that performs printing on a print medium by an ink jet method. The print medium may be a medium, on which the liquid discharge device 100 can perform printing, and may be, for example, various papers, various cloths, various films, and the like without particular limitation. The liquid discharge device 100 may be a serial type printer or a line type printer.

As shown in FIG. 2, the liquid discharge device 100 includes a head unit 110, a moving mechanism 120, a communication device 130, a storage circuit 140, and a processing circuit 150.

The head unit 110 is an assembly including a head chip 111, a drive circuit 112, a storage circuit 113, a power supply circuit 114, and a drive signal generation circuit 115.

In the example shown in FIG. 2, the head unit 110 is divided into a liquid discharge head 110a including the head chip 111, the drive circuit 112, and the storage circuit 113, and a control module 110b including the power supply circuit 114 and the drive signal generation circuit 115. The head unit 110 is not limited to an aspect of being classified into the liquid discharge head 110a and the control module 110b, and, for example, a part or all of the control module 110b may be incorporated in the liquid discharge head 110a.

The head chip 111 discharges ink toward the print medium. In FIG. 2, among components of the head chip 111, a plurality of drive elements 111f are typically shown.

In the example shown in FIG. 2, the number of head chips 111 included in the head unit 110 is one, but the number may be two or more. When the liquid discharge device 100 is a serial type, one or more head chips 111 are arranged so that a plurality of nozzles are distributed over a part of the width direction of the print medium. Further, when the liquid discharge device 100 is a line type, two or more head chips 111 are arranged so that a plurality of nozzles are distributed over the entire width direction of the print medium.

The drive circuit 112 switches whether or not to supply a drive signal Com output from the drive signal generation circuit 115 as a drive pulse PD for each of the plurality of drive elements 111ƒ of the head chip 111 under the control of the processing circuit 150. The drive circuit 112 includes, for example, a group of switches such as a transmission gate for the switching.

The storage circuit 113 stores the first information D1. The storage circuit 113 includes, for example, one or both semiconductor memories of one or more volatile memories, such as a Random Access Memory (RAM), and one or more non-volatile memories such as a Read Only Memory (ROM), an Electrically Erasable Programmable Read-Only Memory (EEPROM), or a Programmable ROM (PROM). The storage circuit 113 is an example of a first storage section.

The first information D1 is information unique to the liquid discharge head 110a. For example, the first information D1 is a serial number of the liquid discharge head 110a.

The power supply circuit 114 receives power from a commercial power source (not shown) and generates various predetermined potentials. The generated various potentials are appropriately supplied to each section of the liquid discharge device 100. In the example shown in FIG. 2, the power supply circuit 114 generates a power supply potential VHV and an offset potential VBS. The offset potential VBS is supplied to the head chip 111 and the like. Further, the power supply potential VHV is supplied to the drive signal generation circuit 115 and the like.

The drive signal generation circuit 115 is a circuit that generates the drive signal Com for driving each drive element 111ƒ of the head chip 111. Specifically, the drive signal generation circuit 115 includes, for example, a DA conversion circuit and an amplifier circuit. In the drive signal generation circuit 115, the DA conversion circuit converts a waveform designation signal dCom, which will be described later from the processing circuit 150, from a digital signal to an analog signal, and the amplifier circuit generates the drive signal Com by amplifying the analog signal using the power supply potential VHV from the power supply circuit 114. Here, among the waveforms included in the drive signal Com, the signal of the waveform, which is actually supplied to the drive element 111ƒ, is the drive pulse PD.

The moving mechanism 120 changes the relative positions of the liquid discharge head 110a and the print medium. More specifically, when the liquid discharge device 100 is a serial type, the moving mechanism 120 has a transporting mechanism for transporting the print medium in a predetermined direction and a moving mechanism for iteratively moving the liquid discharge head 110a along an axis orthogonal to a transporting direction of the print medium. Further, when the liquid discharge device 100 is a line type, the moving mechanism 120 has a transporting mechanism for transporting the print medium in a direction intersecting the longitudinal direction of the long liquid discharge head 110a.

The communication device 130 is a circuit that is communicably connected to the first processing device 200. For example, the communication device 130 is an interface such as a wireless or wired Local Area Network (LAN) or a Universal Serial Bus (USB). The USB is a registered trademark. The communication device 130 may be connected to another first processing device 200 via another network such as the Internet. Further, the communication device 130 may be integrated with the processing circuit 150.

The storage circuit 140 stores various programs executed by the processing circuit 150, various data such as print data processed by the processing circuit 150, and the second information D2. The storage circuit 140 includes, for example, one or both semiconductor memories of one or more volatile memories such as the RAM and one or more non-volatile memories such as the ROM, the EEPROM, or the PROM. The print data is supplied from, for example, the first processing device 200. The storage circuit 140 may be configured as a part of the processing circuit 150. Further, the storage circuit 140 is an example of a second storage section.

Further, the second information D2 is information related to the liquid discharge device 100. For example, the second information D2 is one or both of the manufacturer name and the product number of the portion in the liquid discharge device 100 excluding the liquid discharge head 110a. Hereinafter, in the present embodiment, a case where the second information D2 is the manufacturer name in the above will be described as an example.

The processing circuit 150 has a function of controlling the operation of each section of the liquid discharge device 100 and a function of processing various data. The processing circuit 150 includes, for example, one or more processors such as a Central Processing Unit (CPU). The processing circuit 150 may include a programmable logic device such as Field-Programmable Gate Array (FPGA) in place of the CPU or in addition to the CPU.

The processing circuit 150 controls the operation of each section of the liquid discharge device 100 by executing a program stored in the storage circuit 140. Here, the processing circuit 150 generates signals, such as a control signal Sk, a print data signal SI, and a waveform designation signal dCom, as signals for controlling the operation of each section of the liquid discharge device 100.

The control signal Sk is a signal for controlling the drive of the moving mechanism 120. The print data signal SI is a signal for controlling the drive of the drive circuit 112. Specifically, the print data signal SI designates whether or not the drive circuit 112 supplies the drive signal Com from the drive signal generation circuit 115 as the drive pulse PD to the liquid discharge head 110a for each predetermined section period. By the designation, the amount of ink and the like discharged from the liquid discharge head 110a are designated. The waveform designation signal dCom is a digital signal for defining the waveform of the drive signal Com generated by the drive signal generation circuit 115.

Further, the processing circuit 150 reads out the first information D1 from the storage circuit 113. Further, the processing circuit 150 reads out the second information D2 from the storage circuit 140. Further, the processing circuit 150 outputs the read first information D1 and second information D2 to the outside of the liquid discharge device 100 by using the communication device 130.

1-3. Configuration of First Processing Device

Figure 3:
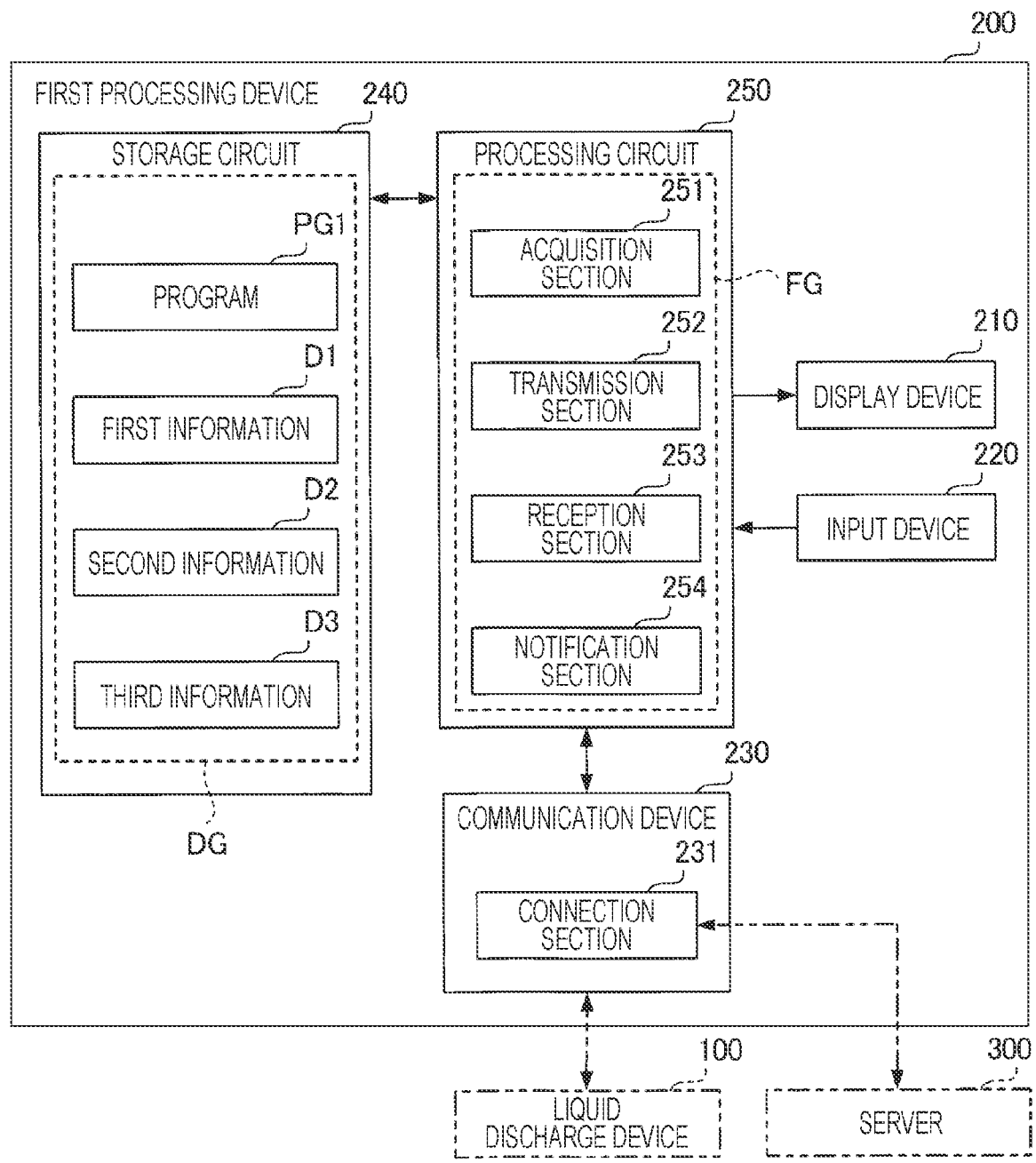
FIG. 3 is a schematic diagram showing a configuration example of a first processing device used in the liquid discharge system according to the first embodiment.

FIG. 3 is a schematic diagram showing a configuration example of the first processing device 200 used in the liquid discharge system 10 according to the first embodiment. The first processing device 200 is a computer such as a desktop type or a notebook type, and controls the printing by the liquid discharge device 100.

As shown in FIG. 3, the first processing device 200 includes a display device 210, an input device 220, a communication device 230, a storage circuit 240, and a processing circuit 250. The devices are communicably connected to each other.

The display device 210 displays various images under the control of the processing circuit 250. Here, the display device 210 has, for example, various display panels such as a liquid crystal display panel or an organic Electro-Luminescence (EL) display panel. The display device 210 may be provided at the outside of the first processing device 200. Further, the display device 210 may be a component of the liquid discharge device 100.

The input device 220 is a machine that accepts an operation from the user. For example, the input device 220 has a pointing device such as a touch pad, a touch panel, or a mouse. Here, when the input device 220 has the touch panel, the input device 220 may also serve as the display device 210. The input device 220 may be provided at the outside of the first processing device 200. Further, the input device 220 may be a component of the liquid discharge device 100.

The communication device 230 is a circuit that is communicably connected to the liquid discharge device 100 and the server 300. For example, the communication device 230 is an interface such as a wireless or wired LAN or USB. The communication device 230 transmits print data to the liquid discharge device 100 or receives the first information D1 and the second information D2 from the liquid discharge device 100 by communicating with the liquid discharge device 100. Further, the communication device 230 transmits the first information D1 and the second information D2, or receives the third information D3 by communicating with the server 300. That is, the communication device 230 functions as a connection section 231 communicably connected to the liquid discharge device 100 and the server 300. The communication device 230 may be integrated with the processing circuit 250. Further, the connection section 231 is an example of the first connection section. The print data is an example of recording data.

The third information D3 is a collation result of a set of the first information D1 and the second information D2 with correspondence information CD1 which will be described later in the server 300 as will be described later. Here, the correspondence information CD1 indicates a set of the serial number of the liquid discharge head 110a and at least one of the manufacturer name and the product number of the liquid discharge device 100.

The storage circuit 240 is a device that stores various programs executed by the processing circuit 250 and various data processed by the processing circuit 250. The storage circuit 240 has, for example, a hard disk drive or a semiconductor memory. A part or all of the storage circuit 240 may be provided in an external storage device of the first processing device 200, the server, or the like.

The storage circuit 240 of the present embodiment stores a program PG1, the first information D1, the second information D2, and the third information D3. A part or all of the program PG1, the first information D1, the second information D2, and the third information D3 may be stored in the external storage device of the first processing device 200, the server, or the like. Further, the program PG1, the first information D1, the second information D2, and the third information D3 are collectively referred to as "data set DG" in the present specification.

The processing circuit 250 is a device having a function of controlling each section of the first processing device 200, the liquid discharge device 100, and the server 300, and a function of processing various data. The processing circuit 250 has, for example, a processor such as the CPU. The processing circuit 250 may be configured by a single processor or may be configured by a plurality of processors. Further, a part or all of the functions of the processing circuit 250 may be realized by hardware such as a Digital Signal Processor (DSP), an Application Specific Integrated Circuit (ASIC), a Programmable Logic Device (PLD), and an FPGA.

The processing circuit 250 functions as an acquisition section 251, a transmission section 252, a reception section 253, and a notification section 254 by reading the program PG1 from the storage circuit 240 and executing the program PG1.

The acquisition section 251 acquires the first information D1 and the second information D2 by communicating with the liquid discharge device 100 using the connection section 231. The acquisition section 251 stores the acquired first information D1 and second information D2 in the storage circuit 240. The acquisition section 251 is an example of a first acquisition section.

The transmission section 252 causes the connection section 231 to transmit the acquired first information D1 and second information D2 to the server 300. The transmission section 252 is an example of the first transmission section.

More specifically, when the user of the liquid discharge device 100 inputs a transmission instruction from the input device 220, the transmission section 252 causes the connection section 231 to immediately transmit the first information D1 and the second information D2 to the server 300.

The reception section 253 causes the connection section 231 to receive the third information D3 from the server 300. Further, the reception section 253 stores the received third information D3 in the storage circuit 240. The reception section 253 is an example of a second reception section.

The notification section 254 outputs a notification related to the liquid discharge device 100 to the outside of the first processing device 200 based on the third information D3. For example, the notification section 254 causes the display device 210 to display the notification by using a display control section (not shown). The notification includes a notification related to the conformity of the liquid discharge device 100. The notification may be, for example, a notification to urge the user of the liquid discharge device 100 to use the regular liquid discharge head 110a. Alternatively, the notification may be, for example, a notification to prompt the user of the liquid discharge device 100 to make an inquiry to the manufacturer of the liquid discharge device 100. Here, the "user" is a concept that includes not only the end user of the liquid discharge device 100 but also an operator who installs the liquid discharge device 100. In particular, when the "user" is the end user, there may be a case where the "user" himself or herself does not install the non-regular liquid discharge head 110a at the liquid discharge device 100 even when the non-regular liquid discharge head 110a is used. Therefore, the first processing device 200 only makes a notification to prompt the "user" to use the regular liquid discharge head 110a and to make an inquiry to the manufacturer. The notification section 254 is an example of a first notification section. Further, the notification is an example of a first notification. Here, "regular" means that the liquid discharge head 110a is compatible with the liquid discharge device 100.

The acquisition section 251, the transmission section 252, the reception section 253, and the notification section 254 are collectively referred to as a "functional section FG" in the present specification.

1-3. Configuration of Server

Figure 4:
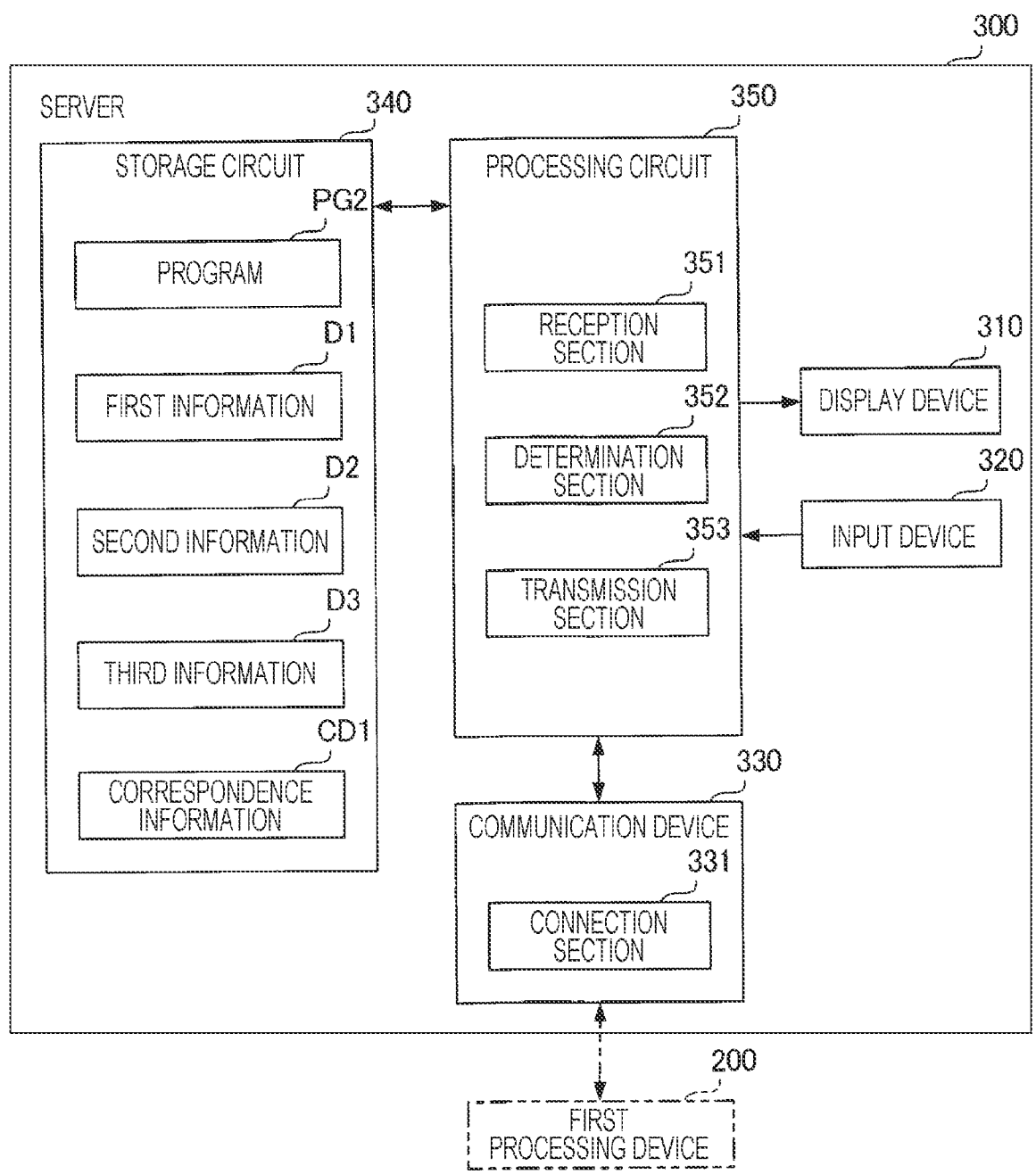
FIG. 4 is a schematic diagram showing a configuration example of a server used in the liquid discharge system according to the first embodiment.

FIG. 4 is a schematic diagram showing a configuration example of the server 300 used in the liquid discharge system 10 according to the first embodiment. The server 300 is a cloud server and is a computer that generates the third information D3 based on the first information D1 and the second information D2.

As shown in FIG. 4, the server 300 includes a display device 310, an input device 320, a communication device 330, a storage circuit 340, and a processing circuit 350. The devices are communicably connected to each other.

The display device 310 is a device that displays various images under the control of the processing circuit 350, and is configured in the same manner as the display device 210 described above.

The input device 320 is a machine that accepts an operation from the user, and is configured to be the same as the above-described input device 220.

The communication device 330 is a circuit that is communicably connected to each first processing device 200, and is configured in the same manner as the above-described communication device 230. That is, the communication device 330 functions as a connection section 331 that is communicably connected to each first processing device 200. The connection section 331 is an example of the first connection section. The communication device 330 may be integrated with the processing circuit 350.

The storage circuit 340 is a device that stores various programs executed by the processing circuit 350 and various data processed by the processing circuit 350, and is configured in the same manner as the above-described storage circuit 240. The storage circuit 340 stores the program PG2, the first information D1, the second information D2, the third information D3, and the correspondence information CD1.

The processing circuit 350 is a device having a function of controlling each section of the server 300 and a function of processing various data, and is configured in the same manner as the above-described processing circuit 250. The processing circuit 350 functions as a reception section 351, a determination section 352, and a transmission section 353 by reading the program PG2 from the storage circuit 340 and executing the program PG2.

The reception section 351 causes the connection section 331 to receive the first information D1 and the second information D2 from the first processing device 200. Further, the reception section 351 stores the received first information D1 and second information D2 in the storage circuit 340. When the first information D1 and the second information D2 are transmitted from the first processing device 200, the reception section 351 immediately receives the first information D1 and the second information D2. However, a method for receiving the first information D1 and the second information D2 is not limited thereto. For example, when the first information D1 and the second information D2 are transmitted from the first processing device 200, the server 300 notifies the first processing device 200 that the first information D1 and the second information D2 are transmitted. The first processing device 200 displays on the display device 210 a message requesting the user of the liquid discharge device 100 to permit the reception of the first information D1 and the second information D2 by the server 300. After confirming the message, the user of the liquid discharge device 100 instructs the input device 220 to permit the server 300 to receive the first information D1 and the second information D2. When the server 300 acquires a signal indicating the permission, the reception section 351 causes the connection section 331 to receive the first information D1 and the second information D2. The method for receiving the first information D1 and the second information D2 may be such a method. The reception section 351 is an example of a first reception section.

The determination section 352 determines whether or not the correspondence relationship between the first information D1 and the second information D2 is stored in the server 300 in advance. More specifically, the determination section 352 collates a set of the received first information D1 and second information D2 with a look-up table in which the correspondence information CD1 is described, thereby determining whether or not the correspondence relationship is stored in the server 300 in advance. Further, the determination section 352 generates the third information D3 indicating the result of the determination. Further, the determination section 352 stores the generated third information D3 in the storage circuit 340. The determination section 352 may determine whether or not the correspondence relationship is stored in the server 300 in advance by a method that does not use the look-up table.

Further, when the reception section 351 receives the same set of the first information D1 and the second information D2 a plurality of times and the determination section 352 determines that the same correspondence relationship between the first information D1 and the second information D2 is stored in the storage circuit 340 in advance a plurality of times, the determination section 352 generates the third information D3 indicating that the result of the determination is true for the first determination, and generates the third information D3 indicating that the result of the determination is false for determination after the first time. Basically, one liquid discharge head 110a is mounted on only one liquid discharge device 100. Since the first information D1 is a serial number unique to the liquid discharge head 110a, it is unthinkable that the same first information D1 is acquired a plurality of times in a normal usage aspect. It may be considered that this occurs because, regardless that the non-regular liquid discharge head 110a is used, the user or the manufacturer of the liquid discharge device 100 inputs the first information D1 associated with the regular liquid discharge head 110a which is separately obtained and the second information D2 corresponding to the first information D1, and intentionally skips the determination process. Even in the case, as a result, the non-regular liquid discharge head 110a is used for the liquid discharge device 100, so that there is no change in a fact that problems such as discharge characteristics may appear when being used by the end user. Therefore, when the same correspondence relationship between the first information D1 and the second information D2 appears a plurality of times, it is determined to be true only at the first time and false after the first time.

The transmission section 353 causes the first processing device 200 to transmit the third information D3 to the connection section 331. As soon as the third information D3 is generated, the transmission section 353 causes the connection section 331 to transmit the third information D3 to the first processing device 200. However, a method for transmitting the third information D3 is not limited thereto. For example, the transmission section 353 notifies the first processing device 200 that the third information D3 has been generated. Based on the notification, the first processing device 200 displays a message for confirming whether or not to receive the third information D3 on the display device 210. After confirming the message, the user of the liquid discharge device 100 instructs the input device 220 to permit the transmission of the third information D3. When the server 300 acquires the signal indicating the permission, the transmission section 353 causes the first processing device 200 to transmit the third information D3 to the connection section 331. A method of transmitting the third information D3 may be such a method. The transmission section 353 is an example of a second transmission section.

1-4. Processing in Determination Section

FIG. 5 is the look-up table showing an example of the set of the first information D1 and the second information D2, the correspondence information CD1, and the third information D3. Here, for the simplicity, a case where information indicating the serial number of the liquid discharge head 110a is used as the first information D1 and information indicating the manufacturer name of the liquid discharge device 100 is used as the second information D2 will be shown. In the look-up table shown in FIG. 5, the first information D1 is stored in the first column. The second information D2 is stored in a second column. In a third column, the serial number of the regular liquid discharge head 110a in the correspondence information CD1 is stored. In a fourth column, a code indicating the manufacturer name of the liquid discharge device 100 is stored in the correspondence information CD1. In a fifth column, the third information D3 is stored. In an example of the third information D3 shown in FIG. 5, "OK" indicates that a determination result by the determination section 352 is true. On the other hand, "NG" indicates that the determination result by the determination section 352 is false.

In a first row and a second row of a table shown in FIG. 5, the correspondence relationship between the first information D1 and the second information D2 matches the correspondence relationship between the serial number of the regular liquid discharge head 110a and a code indicating the manufacturer name of the liquid discharge device 100, which are shown by the correspondence information CD1. Therefore, the third information D3 is "OK". On the other hand, in a third row, the correspondence relationship between the first information D1 and the second information D2 does not match the correspondence relationship between the serial number of the regular liquid discharge head 110a and the code indicating the manufacturer name of the liquid discharge device 100, which are shown by the correspondence information CD1. Therefore, the third information D3 is "NG". Further, in fourth to eighth rows, the correspondence relationship between the first information D1 and the second information D2 matches the correspondence relationship between the serial number of the regular liquid discharge head 110a and the code indicating the manufacturer name of the liquid discharge device 100, which are shown by the correspondence information CD1. Therefore, the third information D3 is "OK". On the other hand, in a ninth line, the correspondence relationship between the first information D1 and the second information D2 does not match the correspondence relationship between the serial number of the regular liquid discharge head 110a and the code indicating the manufacturer name of the liquid discharge device 100, which are shown by the correspondence information CD1. Therefore, the third information D3 is "NG". Further, in a tenth line, the correspondence relationship between the first information D1 and the second information D2 matches the correspondence relationship between the serial number of the regular liquid discharge head 110a and the code indicating the manufacturer name of the liquid discharge device 100, which are shown by the correspondence information CD1. Therefore, the third information D3 is "OK". On the other hand, in an eleventh line, the correspondence relationship between the first information D1 and the second information D2 matches the correspondence relationship between the serial number of the regular liquid discharge head 110a and the code indicating the manufacturer name of the liquid discharge device 100, which are shown by the correspondence information CD1. However, the correspondence relationship between the first information D1 and the second information D2 in the eleventh row has already been determined in the first row. Therefore, the third information D3 is "NG".

1-5. Process of Liquid Discharge System

Figure 6:
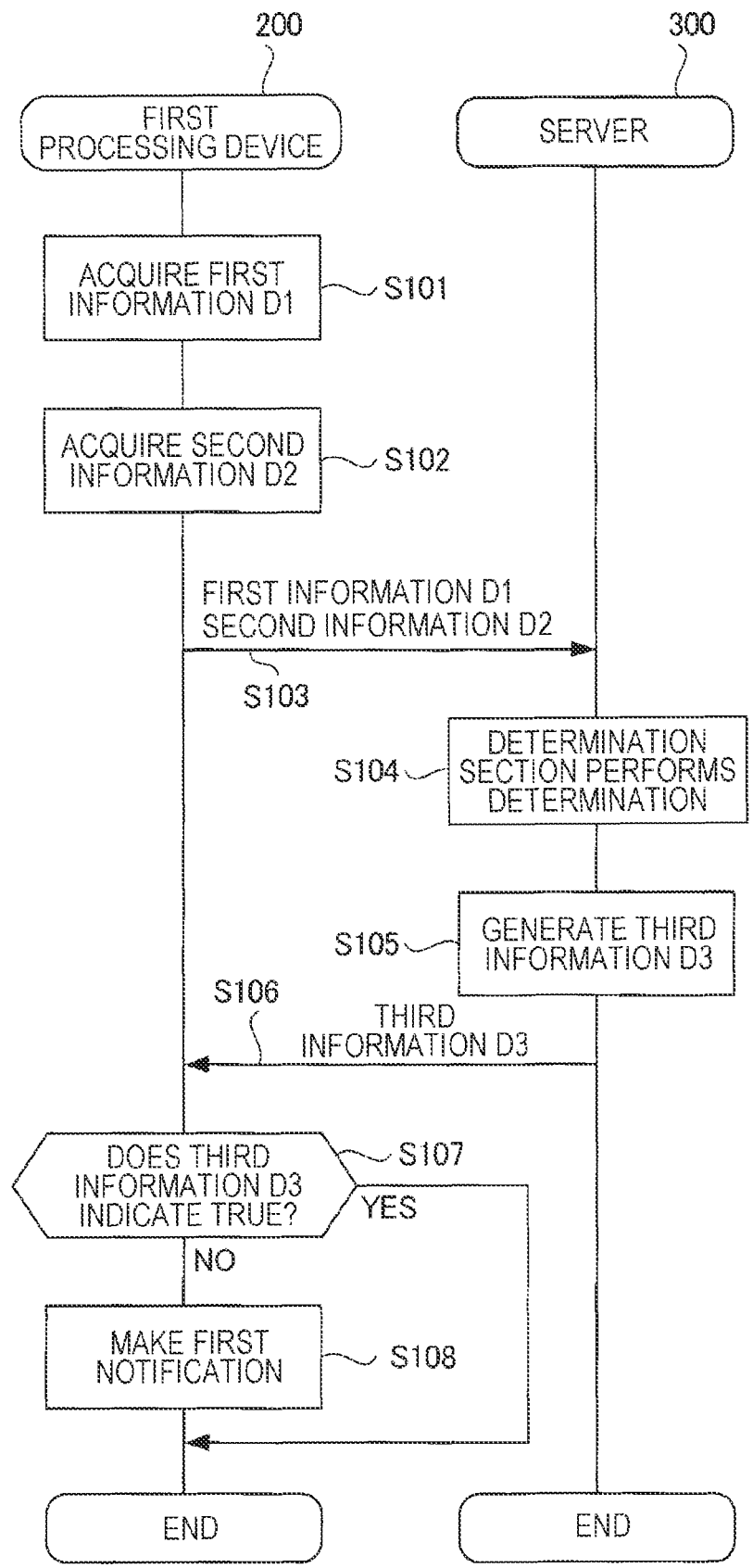
FIG. 6 is a flowchart showing a process of the liquid discharge system according to the first embodiment.

FIG. 6 is a flowchart showing a process of the liquid discharge system 10 according to the first embodiment. The process in FIG. 6 may be executed with an input that the user decides to start the process as a trigger. Further, the process in FIG. 6 may be executed with a fact that the liquid discharge head 110a is mounted on the liquid discharge device 100 as a trigger. In any case, for the process in FIG. 6, the entire process is completed before the user uses the liquid discharge head 110a.

In step S101, the processing circuit 250 of the first processing device 200 functions as the acquisition section 251 to acquire the first information D1.

In step S102, the processing circuit 250 of the first processing device 200 functions as the acquisition section 251 to acquire the second information D2.

In step S103, the processing circuit 250 of the first processing device 200 functions as the transmission section 252 to transmit the first information D1 and the second information D2 to the server 300. Further, the processing circuit 350 of the server 300 functions as the reception section 351 to receive the first information D1 and the second information D2.

In step S104, the processing circuit 350 of the server 300 functions as the determination section 352 to determine whether or not the correspondence relationship between the first information D1 and the second information D2 is stored in the server 300 in advance.

In step S105, the processing circuit 350 of the server 300 functions as the determination section 352 to generate the third information D3 indicating the determination result.

In step S106, the processing circuit 350 of the server 300 functions as the transmission section 353 to transmit the third information D3 to the first processing device 200. After that, the processing circuit 350 of the server 300 ends all the processes. Further, the processing circuit 250 of the first processing device 200 functions as the reception section 253 to receive the third information D3.

When the third information D3 indicates true, that is, when YES in step S107, the processing circuit 250 of the first processing device 200 ends all the processes. When the third information D3 indicates false, that is, when NO in step S107, the processing circuit 250 of the first processing device 200 executes the process of step S108.

In step S108, the processing circuit 250 of the first processing device 200 functions as the notification section 254 to output the first notification related to the liquid discharge device 100 to the outside of the first processing device 200 based on the third information D3. After that, the processing circuit 250 of the first processing device 200 ends all the processes.

1-6. Effect of Liquid Discharge System

The liquid discharge system 10 according to the present embodiment has the liquid discharge head 110a for discharging a liquid, the liquid discharge device 100 on which the liquid discharge head 110a is mounted, the first processing device 200 that is connected to the liquid discharge device 100 and generates recording data used to cause the discharge operation of the liquid discharge head 110a to be performed in the liquid discharge device 100, and the server 300 that can be connected to the network. Further, the liquid discharge system 10 includes the acquisition section 251, the transmission section 252, the reception section 351, the determination section 352, the transmission section 353, the reception section 253, and the notification section 254. The acquisition section 251 acquires the first information D1 unique to the liquid discharge head 110a and the second information D2 related to the liquid discharge device 100. The transmission section 252 transmits the first information D1 and the second information D2 acquired by the acquisition section 251 to the server 300 via the network connection. In the server 300, the reception section 351 receives the first information D1 and the second information D2 via the network connection. In the server 300, the determination section 352 determines whether or not the correspondence relationship between the first information D1 and the second information D2 is stored in the server 300 in advance. From the server 300, the transmission section 353 transmits the third information D3 related to the determination result of the determination section 352 via the network connection. The reception section 253 receives the third information D3 via the network connection. The notification section 254 makes a first notification to the outside based on the third information D3 received by the reception section 253. Specifically, when the third information D3 indicates true, the first notification is not executed, and, when the third information D3 indicates false, the first notification is executed. More specifically, in the operation shown in the flowchart of FIG. 6, authenticity determination for the third information D3 is executed in step S107. When the third information D3 indicates true, the processing circuit 250 of the first processing device 200 ends all the processes. When the third information D3 indicates false, the processing circuit 250 of the first processing device 200 executes the process of step S108. In step S108, the notification section 254 outputs the first notification related to the liquid discharge device 100 to the outside of the first processing device 200 based on the third information D3. After that, the processing circuit 250 of the first processing device 200 ends all the processes.

As described above, in the recent business model, there is a case where the manufacturer of the head is different from the manufacturer of the printer main body which is an element excluding the head in the elements constituting the printer. The manufacturer of the head has different parameters, such as piezoelectric characteristics, liquid flow paths, nozzles, and the like for each purpose of the printer. However, there is a case where the manufacturer of the printer main body manufactures the printer using a head different from the head that is originally supposed to be used due to malicious intent or negligence caused by cost, inventory, or the like. Therefore, the manufacturer of the head, not the manufacturer of the printer main body, incorporates an authentication system having the above configuration into the liquid discharge system 10. By the authentication system, the liquid discharge system 10 has the configuration, so that the user of the printer as the liquid discharge device 100 can grasp the use of the head as a liquid discharge head 110a, which is not a regular product, for the printer main body at a stage before actually using the printer. Also, in the related art, in order to know a head type, the firmware of the printer is required to have a detection algorithm. However, since the structure of the firmware differs depending on the manufacturer of the printer, it has been difficult to make the firmware a common specification. Furthermore, it is difficult to constantly update the firmware to the latest version. On the other hand, according to the liquid discharge system 10 according to the present embodiment, even when the manufacturers of the printer are different, it is possible to use a system having common specifications among the manufacturers.

Further, the first processing device 200 has the connection section 231 that can be connected to the server 300 via the network. The transmission section 252 causes the connection section 231 to transmit the first information D1 and the second information D2 to the server 300. The reception section 253 causes the connection section 231 to receive the third information D3 from the server 300.

By having the configuration, the liquid discharge system 10 can determine whether or not the server 300 is unique and the correspondence relationship between the first information D1 and the second information D2 is stored in the server 300 in advance.

Further, the first notification includes a notification related to the conformity of the liquid discharge device 100.

By having the configuration, the liquid discharge system 10 can make a notification related to the liquid discharge device 100 to the outside of the liquid discharge system 10.

Further, the first notification includes a notification to urge the user of the liquid discharge device 100 to use the regular liquid discharge head 110a.

By having the configuration, the liquid discharge system 10 can urge the user of the printer as the liquid discharge device 100 to use the head as the regular liquid discharge head 110a.

Further, the first notification includes a notification to prompt the user of the liquid discharge device 100 to make an inquiry to the manufacturer of the liquid discharge device 100.

By having the configuration, the liquid discharge system 10 can prompt the user of the printer as the liquid discharge device 100 to make an inquiry to the manufacturer of the liquid discharge device 100.

Further, the server 300 is preferably a cloud server, but may be an on-premises server.

When the liquid discharge system 10 has the configuration, the server 300 can determine whether or not the correspondence relationship between the first information D1 and the second information D2 is stored in the server 300 in advance from the set of the liquid discharge device 100 and the first processing device 200 in remote.

Further, when the determination section 352 determines that the correspondence relationship between the first information D1 and the second information D2 is stored in the server 300 in advance and determines that the same correspondence relationship is stored in the server 300 in advance a plurality of times, the notification section 254 makes the first notification.

By having the configuration, when the liquid discharge system 10 is manufactured by the same manufacturer as the first printer in which the head that is a regular product is installed, and, when, for the second printer in which the head that is not a regular product is installed, the set of the first information D1 and the second information D2, which is the same as in the first printer, is input to the determination section 352 of the server 300, the notification section 254 can make the first notification.

Further, the liquid discharge head 110a has the storage circuit 113 that stores the first information D1. The liquid discharge device 100 has the storage circuit 140 that stores the second information D2. The acquisition section 251 acquires the first information D1 by reading the first information D1 stored in the storage circuit 113. Further, the acquisition section 251 acquires the second information D2 by reading the second information D2 stored in the storage circuit 140.

When the liquid discharge system 10 has the configuration, the acquisition section 251 can acquire the first information D1 and the second information D2 without relying on, for example, manual input by the user of the liquid discharge device 100.

Further, the first information D1 is the serial number of the liquid discharge head 110a.

By having the configuration, the liquid discharge system 10 can use information unique to the liquid discharge head 110a as the first information D1.

Further, the second information D2 is at least one of the manufacturer name and the product number of the liquid discharge device 100.

By having the configuration, the liquid discharge system 10 can use at least one of the manufacturer name and the product number of the liquid discharge device 100 as the second information D2.

2. Second Embodiment

Hereinafter, a second embodiment of the present disclosure will be described. For elements whose actions or functions are the same as in the first embodiment in the embodiment exemplified below, the reference numerals used in the description of the first embodiment will be used and detailed description of each will be omitted as appropriate.

2-1. Outline of Liquid Discharge System

Figure 7:
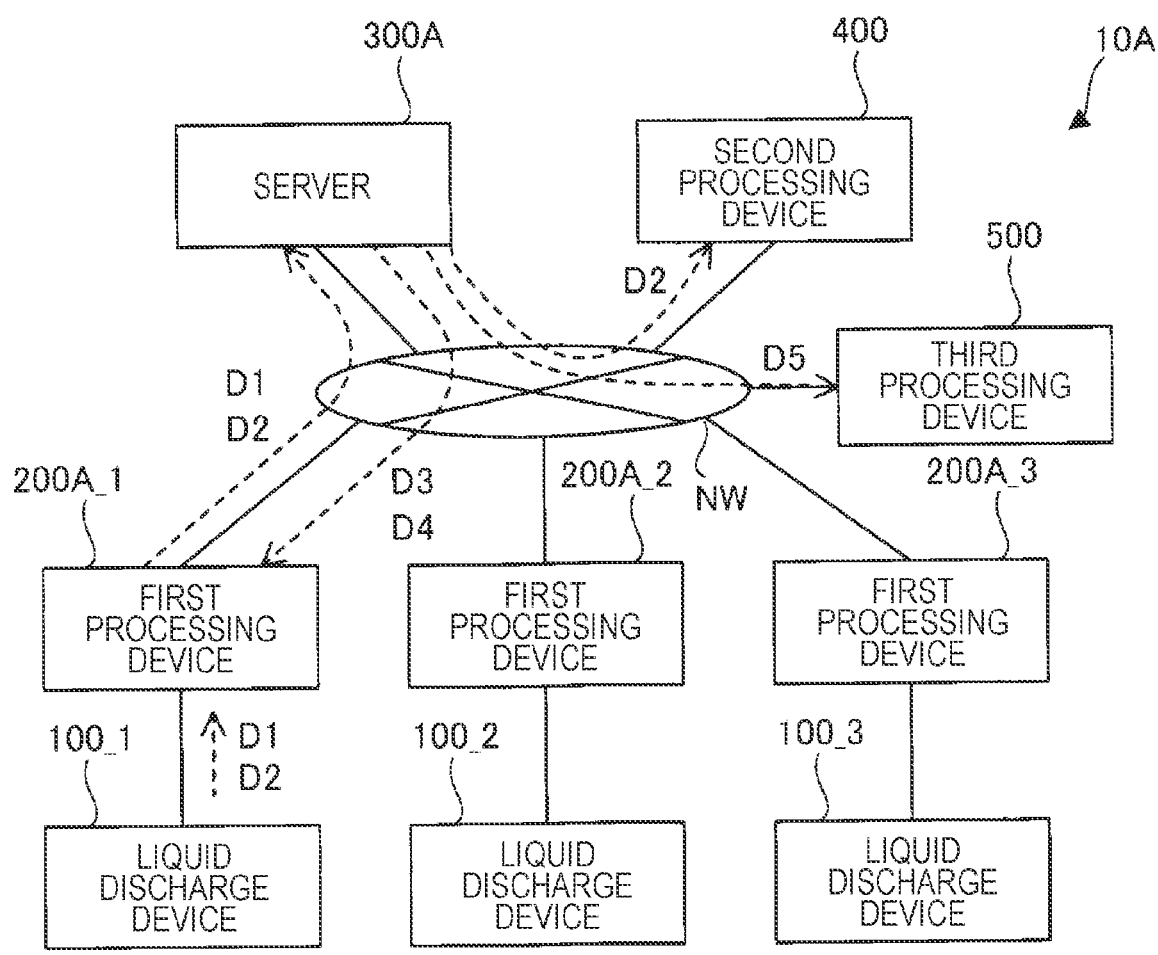
FIG. 7 is a schematic diagram showing a configuration example of a liquid discharge system according to a second embodiment.

FIG. 7 is a schematic diagram showing a configuration example of the liquid discharge system 10A according to the second embodiment. Compared to the liquid discharge system 10 according to the first embodiment, the liquid discharge system 10A is different from the liquid discharge system 10 in a fact that the liquid discharge system 10A has a first processing device 200A instead of the first processing device 200, and further has a second processing device 400 and a third processing device 500.

Further, as shown in FIG. 7, in the liquid discharge system 10A, similar to the liquid discharge system 10, the first information D1 and the second information D2 are transmitted to the first processing device 200A from the liquid discharge device 100. Further, the first information D1 and the second information D2 are transmitted to the server 300A from the first processing device 200A. On the other hand, the third information D3 is transmitted to the first processing device 200A from the server 300A. In addition to this, fourth information D4 is transmitted to the first processing device 200A from the server 300A. Further, the second information D2 is transmitted to the second processing device 400 from the server 300A. Further, fifth information D5 is transmitted to the third processing device 500 from the server 300A. Details of the fourth information D4 and the fifth information D5 will be described later based on FIGS. 8, 9, 10, and 11.

2-2. Configuration of First Processing Device

Figure 8:
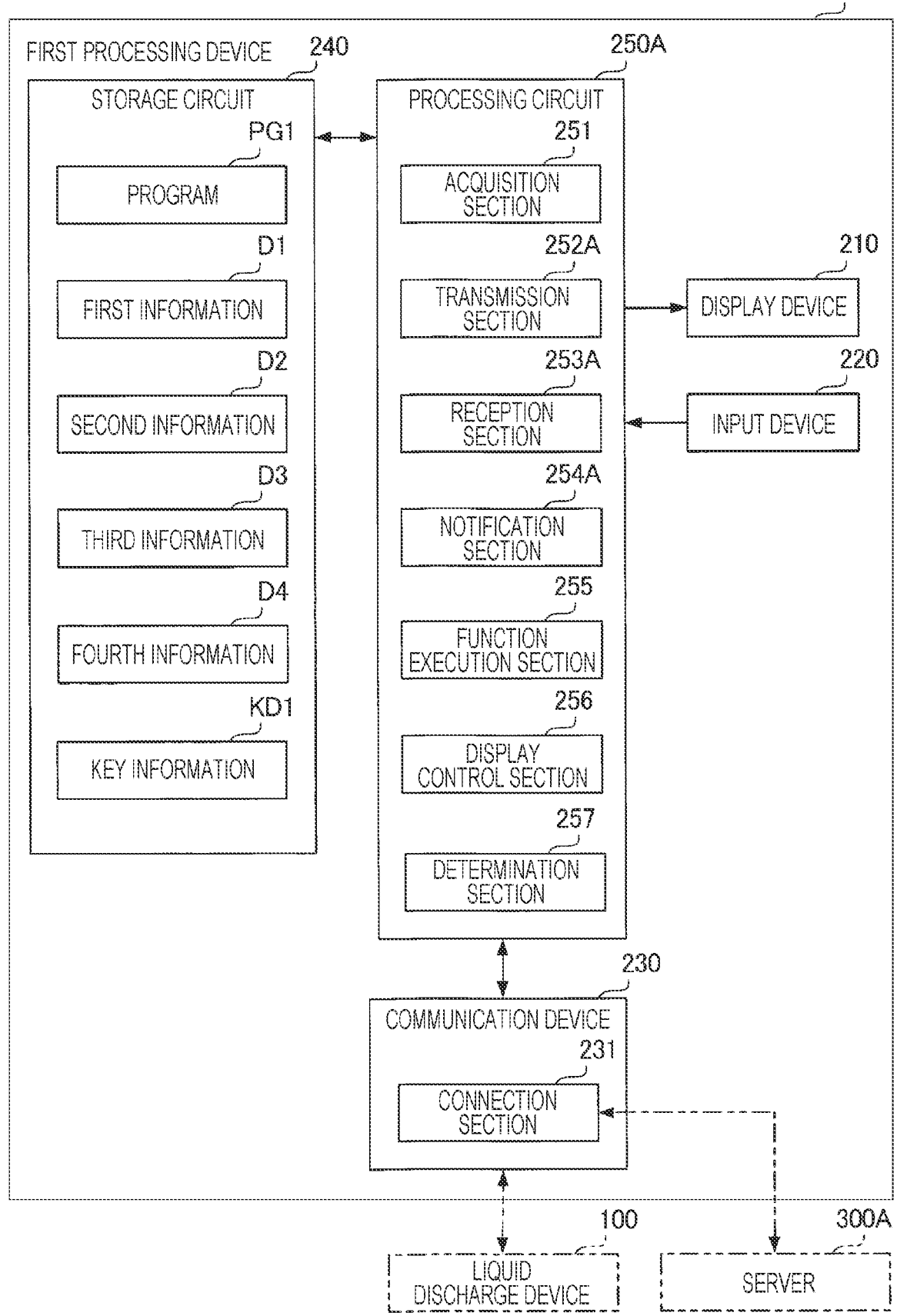
FIG. 8 is a schematic diagram showing a configuration example of a first processing device used in the liquid discharge system according to the second embodiment.

FIG. 8 is a schematic diagram showing a configuration example of the first processing device 200A used in the liquid discharge system 10A according to the second embodiment. Compared to the first processing device 200 according to the first embodiment, the first processing device 200A is different from the first processing device 200 in a fact that the storage circuit 240 further stores the fourth information D4 and key information KD1, and a processing circuit 250A is provided instead of the processing circuit 250.

The fourth information D4 is information indicating a collation result between a regular activation key generated by the server 300A and an activation key input from the first processing device 200A in order to cause the liquid discharge device 100 to perform a predetermined function. The regular activation key generated by the server 300A is an example of a first activation key. On the other hand, the activation key input from the first processing device 200A is an example of a second activation key. Here, the "activation key" is a text string input by the user of the liquid discharge device 100 in order to authenticate the right to use the predetermined function.

The key information KD1 is key information indicating the regular activation key generated by the server 300A.

Compared to the processing circuit 250 according to the first embodiment, the processing circuit 250A is different from the processing circuit 250 in a fact that the processing circuit 250A further has a transmission section 252A instead of the transmission section 252, a reception section 253A instead of the reception section 253, and a notification section 254A instead of the notification section 254, and further has a function execution section 255, a display control section 256, and a determination section 257.

Similar to the transmission section 252, the transmission section 252A causes the connection section 231 to transmit the acquired first information D1 and second information D2 to the server 300A. Further, as will be described later, the transmission section 252A causes the connection section 231 to transmit the key information KD2 indicating the activation key input from the input device 220 to the server 300A.

Similar to the reception section 253, the reception section 253A causes the connection section 231 to receive the third information D3 from the server 300A. Further, the reception section 253A stores the received third information D3 in the storage circuit 240. Further, the reception section 253A causes the connection section 231 to receive the key information KD1 indicating the regular activation key from the server 300A. Further, the reception section 253A stores the received key information KD1 in the storage circuit 240. Further, the reception section 253A causes the connection section 231 to receive the fourth information D4 from the server 300A. Further, the reception section 253A stores the received fourth information D4 in the storage circuit 240.

Similar to the notification section 254, the notification section 254A outputs a notification related to the liquid discharge device 100 to the outside of the first processing device 200 based on the third information D3. Further, when the collation result indicated by the fourth information D4 is false, the notification section 254A notifies an error to the outside of the first processing device 200.

The function execution section 255 causes the liquid discharge device 100 to perform a predetermined function based on the fourth information D4. Here, the "predetermined function" is mainly a general function that can be performed when the liquid discharge device 100 and the server 300A are connected to each other. Specifically, the "predetermined function" includes, for example, a function in which the liquid discharge device 100 acquires the waveform of the drive signal Com optimized for the liquid discharge head 110a from the server 300A. In this case, information indicating the waveform of the drive signal Com is added to the fourth information D4 received by the first processing device 200A from the server 300A.

Further, when the server 300A, which will be described later, determines that the correspondence relationship between the first information D1 and the second information D2 is not stored in the server 300A in advance, the function execution section 255 does not permit the liquid discharge device 100 to perform the predetermined function of the function execution section 255.

The display control section 256 causes the display device 210 to display a display for inputting the first information D1 and the second information D2 to the user of the liquid discharge device 100. The user of the liquid discharge device 100 inputs the first information D1 and the second information D2 from the input device 220 based on the display displayed on the display device 210. The acquisition section 251 acquires the first information D1 and the second information D2 input from the input device 220. Similar to the first embodiment, the acquisition section 251 may acquire the first information D1 and the second information D2 by communicating with the liquid discharge device 100 using the connection section 231.

Further, the display control section 256 causes the display device 210 to display a display for causing the user of the liquid discharge device 100 to input the activation key. The user of the liquid discharge device 100 inputs the activation key from the input device 220 according to an instruction displayed on the display device 210. The key information KD2 indicating the input activation key is transmitted to the server 300A by the transmission section 252A.

The determination section 257 determines whether the determination result indicated by the third information D3 received by the reception section 253A is true or false.

When the third information D3 indicates false, the notification section 254 makes the above-described first notification to the outside.

2-3. Configuration of Server

Figure 9:
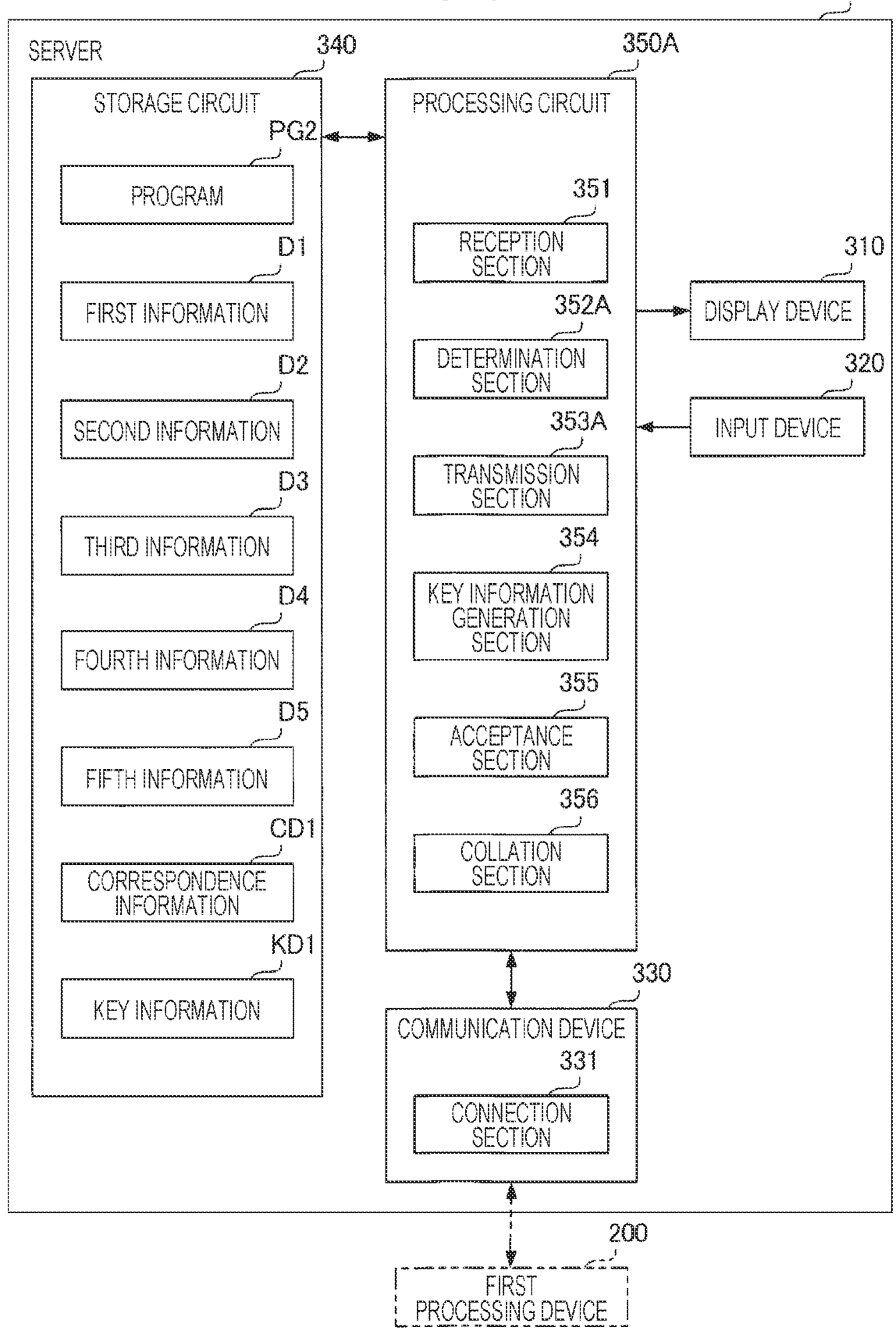
FIG. 9 is a schematic diagram showing a configuration example of a server used in the liquid discharge system according to the second embodiment.

FIG. 9 is a schematic diagram showing a configuration example of the server 300A used in the liquid discharge system 10A according to the second embodiment.

Compared to the server 300 according to the first embodiment, the server 300A is different from the server 300 in a fact that the storage circuit 340 further stores the fourth information D4 and the fifth information D5 and the processing circuit 350A is provided instead of the processing circuit 350.

The fifth information D5 is information indicating an instruction for causing the second processing device 400, which will be described later, to make a second notification. Details of the second notification will be described later.

Compared to the processing circuit 350 according to the first embodiment, the processing circuit 350A is different from the processing circuit 350 in a fact that the processing circuit 350A has a determination section 352A instead of the determination section 352 and a transmission section 353A instead of the transmission section 353, and further has a key information generation section 354, an acceptance section 355, a collation section 356.

Similar to the determination section 352, the determination section 352A determines whether or not the correspondence relationship between the first information D1 and the second information D2 is stored in the server 300 in advance. Then, when it is determined that the correspondence relationship between the first information D1 and the second information D2 is stored in the server 300 in advance, the determination section 352A generates the third information D3. On the other hand, when the determination section 352A determines that the correspondence relationship between the first information D1 and the second information D2 is not stored in the server 300 in advance, the third information D3 and the fifth information D5 are generated.

Similar to the transmission section 353, the transmission section 353A causes the connection section 331 to transmit the third information D3 and the fourth information D4 to the first processing device 200A. Further, the transmission section 353A causes the connection section 331 to transmit the fifth information D5 to the second processing device 400. Further, when the determination section 352A determines that the correspondence relationship between the first information D1 and the second information D2 is not stored in the server 300A in advance, the transmission section 353A causes the third processing device 500 to transmit the second information D2 to the connection section 331. When the determination section 352A determines that the correspondence relationship between the first information D1 and the second information D2 is stored in the server 300A in advance, the transmission section 353A does not cause the third processing device 500 to transmit the second information D2 to the connection section 331. The transmission section 353A is an example of a third transmission section.

When the determination section 352A determines that the correspondence relationship between the first information D1 and the second information D2 is stored in the storage circuit 340 in advance, the key information generation section 354 generates the key information KD1 indicating the activation key. More specifically, the key information generation section 354 generates the key information KD1 to have a different activation key according to the first information D1.

The acceptance section 355 accepts the activation key input from the first processing device 200A. More specifically, the acceptance section 355 uses the connection section 331 of the communication device 330 to accept the key information KD2 indicating the activation key input from the first processing device 200A.

The collation section 356 collates the key information KD1 indicating the activation key generated by the key information generation section 354 with the key information KD2 indicating the activation key accepted by the acceptance section 355. Further, the collation section 356 generates the fourth information D4 indicating the collation result.

2-4. Configuration of Second Processing Device

Figure 10:
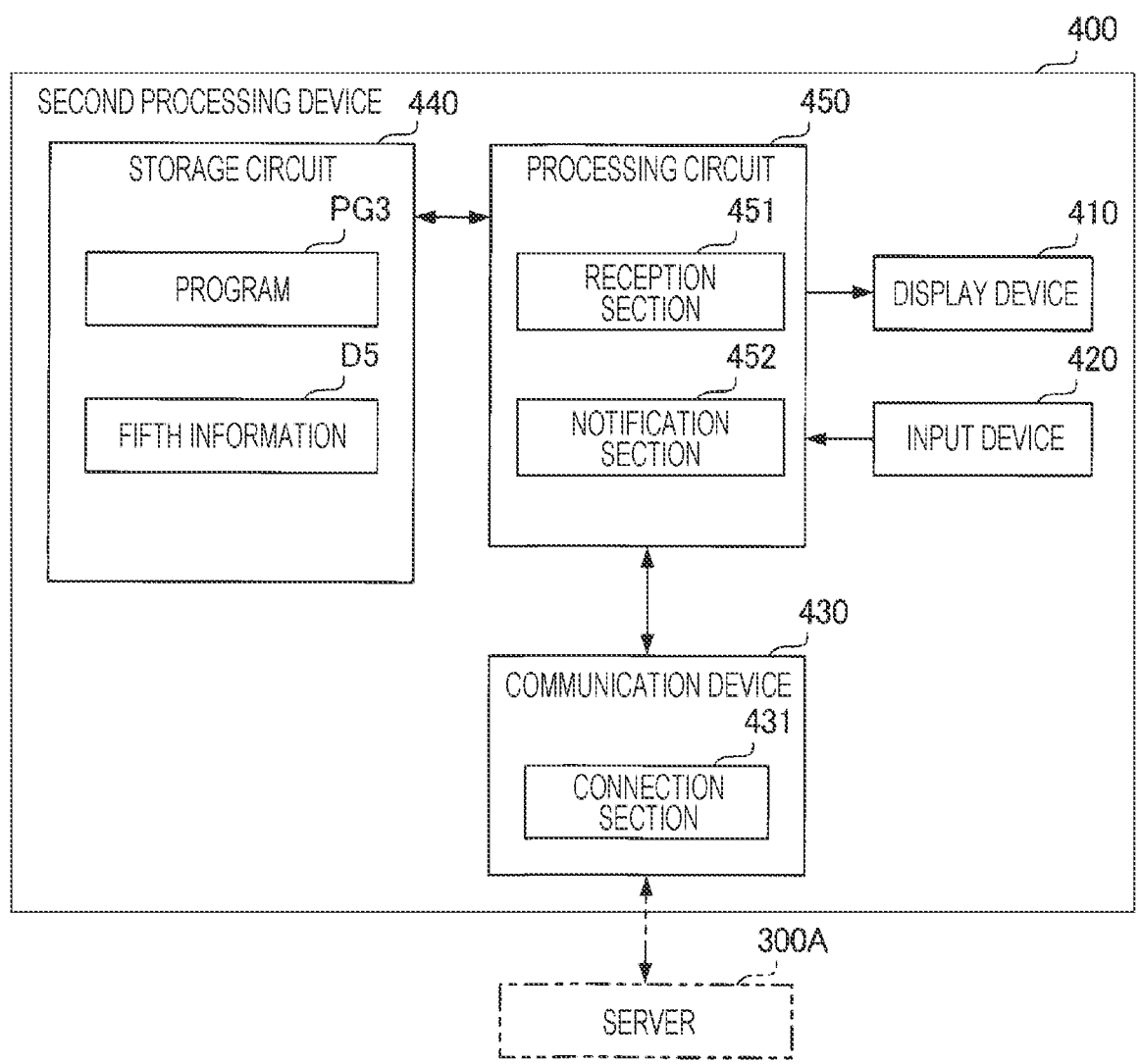
FIG. 10 is a schematic diagram showing a configuration example of a second processing device used in the liquid discharge system according to the second embodiment.

FIG. 10 is a schematic diagram showing a configuration example of the second processing device 400 used in the liquid discharge system 10A according to the second embodiment. The second processing device 400 is a computer such as a desktop type or a notebook type, and is assumed to be used by the manufacturer of the liquid discharge device 100. When the liquid discharge head 110a included in the liquid discharge device 100 is not a regular product, the second processing device 400 notifies that the liquid discharge head 110a is not the regular product.

As shown in FIG. 10, the second processing device 400 includes a display device 410, an input device 420, a communication device 430, a storage circuit 440, and a processing circuit 450. The devices are communicably connected to each other.

The display device 410 displays various images under the control of the processing circuit 450. Here, the display device 410 has, for example, various display panels such as a liquid crystal display panel or an organic EL display panel. The display device 410 may be provided at the outside of the second processing device 400.

The input device 420 is a machine that accepts an operation from the user. For example, the input device 420 has a pointing device such as a touch pad, a touch panel, or a mouse. Here, when the input device 420 has the touch panel, the input device 420 may also serve as the display device 410. The input device 420 may be provided at the outside of the second processing device 400.

The communication device 430 is a circuit that is communicably connected to the server 300A. For example, the communication device 430 is an interface such as a wireless or wired LAN or USB. The communication device 430 receives the fifth information D5 from the server 300A by communicating with the server 300A. That is, the communication device 430 functions as a connection section 431 that is communicably connected to the server 300A. The communication device 430 may be integrated with the processing circuit 450.

The storage circuit 440 is a device that stores various programs executed by the processing circuit 450 and various data processed by the processing circuit 450. The storage circuit 440 has, for example, a hard disk drive or a semiconductor memory. A part or all of the storage circuit 440 may be provided in an external storage device of the second processing device 400, the server, or the like.

The program PG3 and the fifth information D5 are stored in the storage circuit 440 of the present embodiment. A part or all of the program PG3 and the fifth information D5 may be stored in an external storage device of the second processing device 400, the server, or the like.

The processing circuit 450 is a device having a function of controlling each section of the second processing device 400 and a function of processing the various data. The processing circuit 450 has, for example, a processor such as the CPU. The processing circuit 450 may be configured by a single processor or may be configured by a plurality of processors. Further, a part or all of the functions of the processing circuit 450 may be realized by hardware such as DSP, ASIC, PLD, and FPGA.

The processing circuit 450 functions as a reception section 451 and a notification section 452 by reading the program PG3 from the storage circuit 440 and executing the program PG3.

The reception section 451 receives the fifth information D5 by communicating with the server 300A using the connection section 431. The reception section 451 stores the received fifth information D5 in the storage circuit 440.

The notification section 452 outputs a notification related to the liquid discharge device 100 to the outside of the second processing device 400 based on the fifth information D5. For example, the notification section 254 causes the display device 410 to display the notification by using a display control section (not shown). The notification includes a notification indicating that the liquid discharge head 110a used by the manufacturer of the liquid discharge device 100 to manufacture the liquid discharge device 100 is not a regular product. The notification is an example of a second notification.

2-5. Configuration of Third Processing Device

Figure 11:
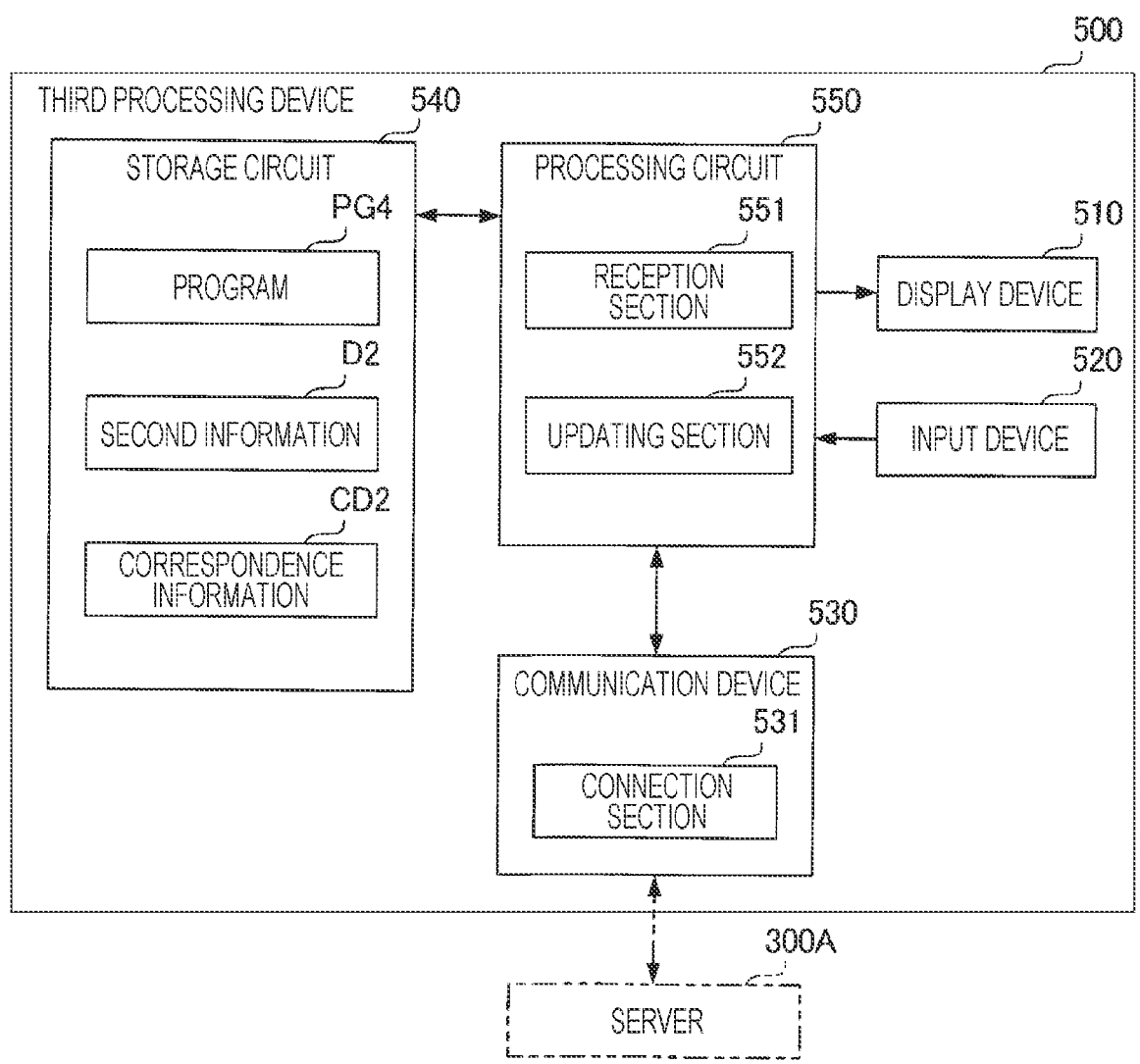
FIG. 11 is a schematic diagram showing a configuration example of a third processing device used in the liquid discharge system according to the second embodiment.

FIG. 11 is a schematic diagram showing a configuration example of the third processing device 500 used in the liquid discharge system 10 according to the second embodiment. The third processing device 500 is a computer such as a desktop type or a notebook type, and is assumed to be used, for example, by the manufacturer of the liquid discharge head 110a. The third processing device 500 updates the correspondence information CD1 possessed by the server 300A.

As shown in FIG. 11, the third processing device 500 includes a display device 510, an input device 520, a communication device 530, a storage circuit 540, and a processing circuit 550. The devices are communicably connected to each other.

The display device 510 displays various images under the control of the processing circuit 550. Here, the display device 510 has, for example, various display panels such as a liquid crystal display panel or an organic EL display panel. The display device 510 may be provided at the outside of the third processing device 500.

The input device 520 is a machine that accepts an operation from the user. For example, the input device 520 has a pointing device such as a touch pad, a touch panel, or a mouse. Here, when the input device 520 has the touch panel, the input device 520 may also serve as the display device 510. The input device 520 may be provided at the outside of the third processing device 500.

The communication device 530 is a circuit that is communicably connected to the server 300A. For example, the communication device 530 is an interface such as a wireless or wired LAN or USB. The communication device 530 updates the correspondence information CD1 possessed by the server 300A by communicating with the server 300A. That is, the communication device 530 functions as a connection section 531 that is communicably connected to the server 300A. The communication device 530 may be integrated with the processing circuit 550.

The storage circuit 540 is a device that stores various programs executed by the processing circuit 550 and various data processed by the processing circuit 550. The storage circuit 540 has, for example, a hard disk drive or a semiconductor memory. A part or all of the storage circuit 540 may be provided in an external storage device of the third processing device 500, the server, or the like. The storage circuit 540 is an example of an external storage section.

The storage circuit 540 of the present embodiment stores a program PG4, the second information D2, and correspondence information CD2. Here, the correspondence information CD2 is the latest correspondence information. A part or all of the program PG4, the second information D2, and the correspondence information CD2 may be stored in an external storage device of the third processing device 500, the server, or the like.

The processing circuit 550 is a device having a function of controlling each section of the third processing device 500 and a function of processing various data. The processing circuit 550 has, for example, a processor such as the CPU. The processing circuit 550 may be configured by a single processor or may be configured by a plurality of processors. Further, a part or all of the functions of the processing circuit 550 may be realized by hardware such as DSP, ASIC, PLD, and FPGA.

The processing circuit 550 functions as a reception section 551 and an updating section 552 by reading the program PG4 from the storage circuit 540 and executing the program PG4.

The reception section 551 receives the second information D2 by communicating with the server 300A using the connection section 531. The reception section 551 stores the received second information D2 in the storage circuit 540.

As described above, when, in the server 300A, the determination section 352A determines that the correspondence relationship between the first information D1 and the second information D2 is not stored in the server 300A in advance, the transmission section 353A causes the connection section 331 to transmit the second information D2 to the third processing device 500. On the other hand, when the determination section 352A determines that the correspondence relationship between the first information D1 and the second information D2 is stored in the server 300A in advance, the transmission section 353A does not cause the connection section 331 to transmit the second information D2 to the third processing device 500. That is, the second information D2 received by the reception section 551 and stored in the storage circuit 540 indicates at least one of the manufacturer name and the product number of the liquid discharge device 100 in which the liquid discharge head 110*a* that is the regular product is not used.

The updating section 552 updates the correspondence information CD1 stored in the server 300A with the latest correspondence information CD2 stored in the storage circuit 540 by communicating with the server 300A using the connection section 531.

2-6. Process of Liquid Discharge System

Figure 12A:
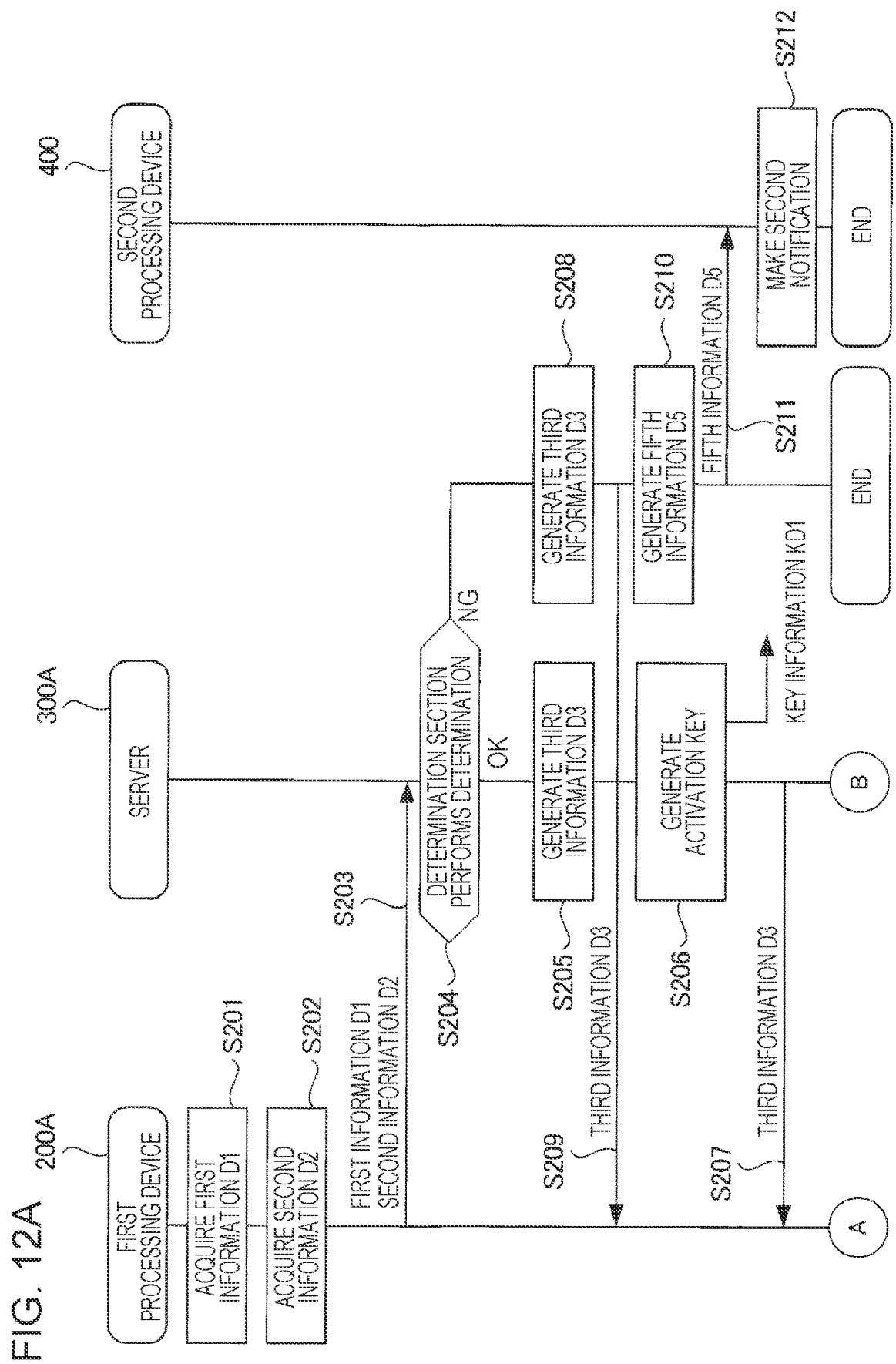
FIG. 12A is a flowchart showing a process of the liquid discharge system according to the second embodiment.

FIGS. 12A and 12B are flowcharts showing the process of the liquid discharge system 10A according to the second embodiment.

In step S201, the processing circuit 250A of the first processing device 200A functions as the acquisition section 251 to acquire the first information D1.

In step S202, the processing circuit 250A of the first processing device 200A functions as the acquisition section 251 to acquire the second information D2.

In step S203, the processing circuit 250A of the first processing device 200A functions as the transmission section 252A to transmit the first information D1 and the second information D2 to the server 300A. Further, the processing circuit 350A of the server 300A functions as the reception section 351 to receive the first information D1 and the second information D2.

In step S204, the processing circuit 350A of the server 300A functions as the determination section 352A to determine whether or not the correspondence relationship between the first information D1 and the second information D2 is stored in the server 300A in advance. When the correspondence relationship between the first information D1 and the second information D2 is stored in the server 300A in advance, that is, when the determination result is true, the processing circuit 350A executes the process of step S205. On the other hand, when the correspondence relationship between the first information D1 and the second information D2 is not stored in the server 300A in advance, that is, when the determination result is false, the processing circuit 350A executes the process of step S208.

In step S205, the processing circuit 350A of the server 300A functions as the determination section 352A to generate the third information D3 indicating the true determination result.

In step S206, the processing circuit 350A of the server 300A functions as the key information generation section 354 to generate an activation key. Further, the processing circuit 350A of the server 300A functions as the key information generation section 354 to generate the key information KD1 indicating the activation key and notifies the user of the liquid discharge device 100 of the key information KD1. As a specific notification method, for example, a notification destination such as an e-mail address in which the user of the liquid discharge device 100 owns an account is registered in advance, and the notification is made with respect to the notification destination.

In step S207, the processing circuit 350A of the server 300 functions as the transmission section 353A to transmit the third information D3 to the first processing device 200A. Further, the processing circuit 250A of the first processing device 200A functions as the reception section 253A to receive the third information D3.

In step S208, the processing circuit 350A of the server 300A functions as the determination section 352A to generate the third information D3 indicating the false determination result.

In step S209, the processing circuit 350A of the server 300 functions as the transmission section 353A to transmit the third information D3 to the first processing device 200A. Further, the processing circuit 250A of the first processing device 200A functions as the reception section 253A to receive the third information D3.

In step S210, the processing circuit 350A of the server 300 functions as the determination section 352A to generate the fifth information D5.

In step S211, the processing circuit 350A of the server 300 functions as the transmission section 353A to transmit the fifth information D5 to the second processing device 400. Further, the processing circuit 450 of the second processing device 400 functions as the reception section 451 to receive the fifth information D5.

In step S212, the processing circuit 450 of the second processing device 400 functions as the notification section 452 to make a second notification related to the liquid discharge device 100 to the outside of the second processing device 400. After that, the processing circuit 450 ends all the processes.

In step S213, the processing circuit 250A of the first processing device 200A functions as the determination section 257 to determine whether or not the determination result indicated by the third information D3 is true. When the determination result is true, the processing circuit 250A of the first processing device 200A executes the process of step S214. When the determination result is false, the processing circuit 250A of the first processing device 200A executes the process of step S216.

In step S214, the processing circuit 250A of the first processing device 200A accepts the activation key input from the input device 220 by the user of the liquid discharge device 100.

In step S215, the processing circuit 250A of the first processing device 200A functions as the transmission section 252A to cause the connection section 231 to transmit the key information KD2 indicating the activation key input from the input device 220 to the server 300. Further, the processing circuit 350A of the server 300A functions as the acceptance section 355 to accept the key information KD2 indicating the activation key input from the first processing device 200A.

In step S216, the processing circuit 250A of the first processing device 200A functions as the notification section 254 to make the above-described first notification to the outside. After that, the processing circuit 250A ends all the processes.

In step S217, the processing circuit 350A of the server 300A functions as the collation section 356 to collate the key information KD1 indicating the activation key generated by the key information generation section 354 with the key information KD2 indicating the activation key accepted by the acceptance section 355. Further, the processing circuit 350A of the server 300A functions as the collation section 356 to generate the fourth information D4 indicating the collation result.

In step S218, the processing circuit 350A of the server 300A functions as the transmission section 353A to cause the connection section 331 to transmit the fourth information D4 to the first processing device 200A. After that, the processing circuit 350A ends all the processes. Further, the processing circuit 250A of the first processing device 200A functions as the reception section 253A to cause the connection section 231 to receive the fourth information D4 from the server 300A.

In step S219, when the collation result indicated by the fourth information D4 is true, the processing circuit 250A of the first processing device 200A executes the process of step S220. When the collation result indicated by the fourth information D4 is false, the processing circuit 250A of the first processing device 200A executes the process of step S221.

In step S220, the processing circuit 250A of the first processing device 200A functions as the function execution section 255 to cause the liquid discharge device 100 to perform a predetermined function. Specifically, the processing circuit 250A functions as the function execution section 255 to release the function restriction of the liquid discharge device 100. After that, the processing circuit 250A ends all the processes.

In step S221, the processing circuit 250A of the first processing device 200A functions as the notification section 254A to notify an error. After that, the processing circuit 250A ends all the processes.

2-7. Effect of Liquid Discharge System

The liquid discharge system 10A according to the present embodiment further has the function execution section 255 that causes the liquid discharge device 100 to perform the predetermined function based on the fourth information D4. The transmission section 353A transmits the fourth information D4 from the server 300A via the network connection. The reception section 253A receives the fourth information D4 from the server 300A via the network connection.

When the liquid discharge system 10A has the configuration, the liquid discharge device 100 can perform a predetermined function based on the fourth information D4 transmitted from the server 300A.

Further, when, in the liquid discharge system 10A according to the present embodiment, the determination section 352A determines that the correspondence relationship between the first information D1 and the second information D2 is not stored in the server 300A in advance, the function execution section 255 does not permit the liquid discharge device 100 to perform the predetermined function.

When the liquid discharge system 10A has the configuration and the correspondence relationship between the first information D1 and the second information D2 is not stored in the server 300A in advance, the liquid discharge device 100 can restrict the execution of the predetermined function based on the fourth information D4 transmitted from the server 300A.

Further, the liquid discharge system 10A according to the present embodiment further has a key information generation section 354 and an acceptance section 355. When the determination section 352A determines that the correspondence relationship between the first information D1 and the second information D2 is stored in the server 300A in advance, the key information generation section 354 generates the key information KD1 indicating the first activation key. The acceptance section 355 accepts the input of the key information KD2 indicating the second activation key. In the server 300A, when the first activation key indicated by the key information KD1 matches the second activation key accepted by the acceptance section 355, the transmission section 353A transmits the fourth information D4 from the server 300A via the network connection.

When the liquid discharge system 10A has the configuration, the user of the liquid discharge device 100 can perform a predetermined function by the liquid discharge device 100 by using the activation key issued by the liquid discharge system 10A.

Further, the key information generation section 354 generates the key information KD1 so that the activation key is different according to the first information D1 received by the reception section 351.

When the liquid discharge system 10A has the configuration, the activation key can be changed according to the first information D1 possessed by the liquid discharge head 110a.

Further, the liquid discharge system 10A according to the present embodiment has the transmission section 353A. When the determination section 352A determines that the correspondence relationship between the first information D1 and the second information D2 is not stored in the server 300A in advance, the transmission section 353A transmits fifth information D5 for causing the liquid discharge head 110a, the liquid discharge device 100, and the second processing device 400 which is different from first processing device 200A to make the second notification via the network connection.

When the liquid discharge system 10A has the configuration and when the correspondence relationship between the first information D1 and the second information D2 is not stored in the server 300A in advance, a specific notification can be made from the second processing device 400.

Further, in the liquid discharge system 10A according to the present embodiment, the second notification includes a notification indicating that the liquid discharge head 110a used by the manufacturer of the liquid discharge device 100 to manufacture the liquid discharge device 100 is not a regular product.

When the liquid discharge system 10A has the configuration and when the correspondence relationship between the first information D1 and the second information D2 is not stored in the server 300A in advance, a notification indicating that the liquid discharge head 110a is not the regular product can be made from the second processing device 400. For example, the manufacturer of the printer uses the second processing device 400 to be able to recognize that the liquid discharge head 110a that is not a regular product is used.

Further, the liquid discharge system 10A according to the present embodiment further includes the third processing device 500 connected to the server 300A via the network.

When the liquid discharge system 10A has the configuration, access to the server 300A is possible from the third processing device 500 which is different from the first processing device 200 and the second processing device 400. Specifically, the manufacturer of the head can access the server 300A from the third processing device 500.

Further, in the liquid discharge system 10A according to the present embodiment, the third processing device 500 has the storage circuit 540. When the determination section 352A determines that the correspondence relationship between the first information D1 and the second information D2 is not stored in the server 300A in advance, the storage circuit 540 stores the second information D2. Further, when the determination section 352A determines that the correspondence relationship between the first information D1 and the second information D2 is stored in the server 300A in advance, the storage circuit 540 does not store the second information D2.

When the liquid discharge system 10A has the configuration, the second information D2 stored in the storage circuit 540 of the third processing device 500 indicates at least one of the manufacturer name and product number of the liquid discharge device 100 in which the liquid discharge head 110a that is a regular product is not used.

3. Third Embodiment

Hereinafter, a third embodiment of the present disclosure will be described. For elements whose actions or functions are the same as in the first embodiment in the embodiment exemplified below, the reference numerals used in the description of the first embodiment will be used and detailed description of each will be omitted as appropriate.

3-1. Outline of Liquid Discharge System

Figure 13:
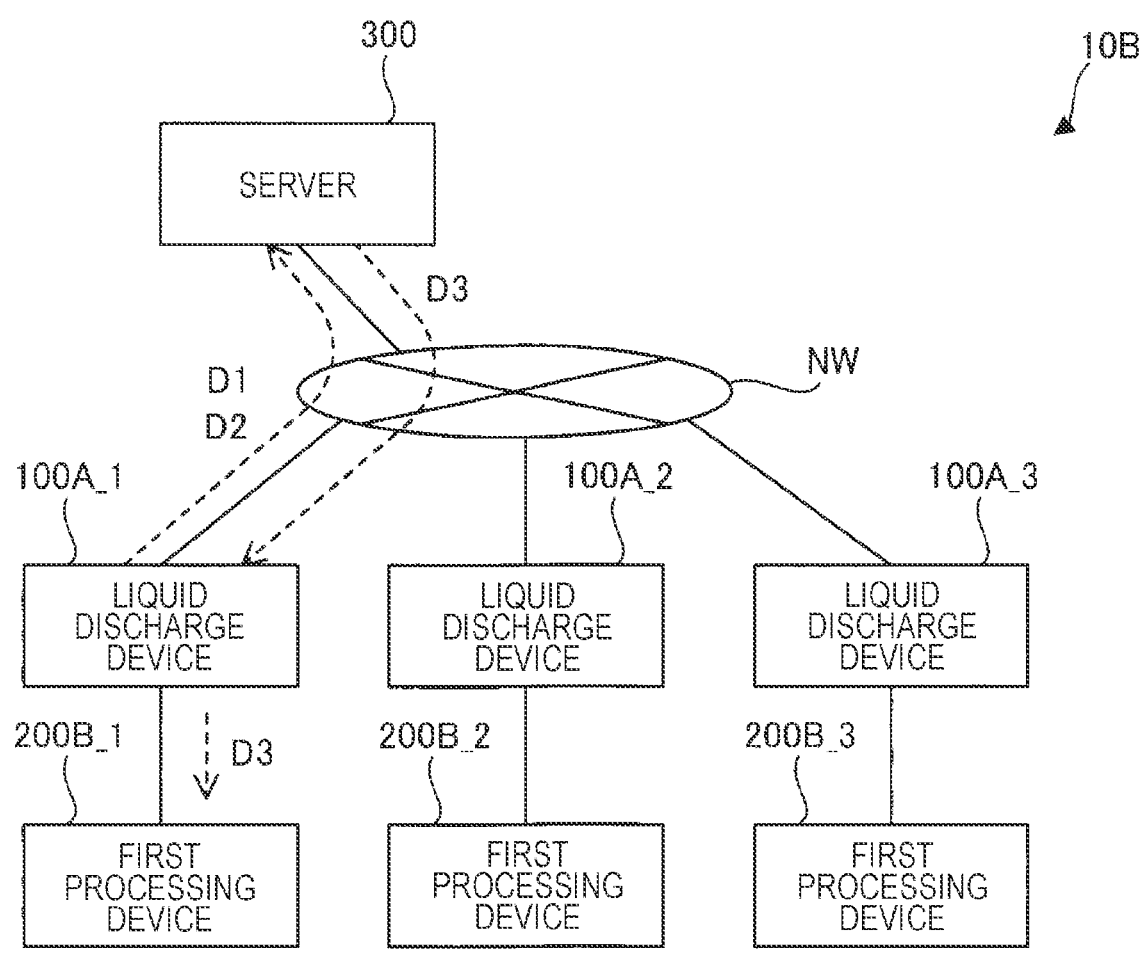
FIG. 13 is a schematic diagram showing a configuration example of a liquid discharge system according to a third embodiment.

FIG. 13 is a schematic diagram showing a configuration example of the liquid discharge system 10B according to the third embodiment. In the example shown in FIG. 13, the liquid discharge system 10B has liquid discharge devices 100A_1 to 100A_3, first processing devices 200B_1 to 200B_3, and a server 300. In the following, the liquid discharge devices 100A_1 to 100A_3 are collectively referred to as a "liquid discharge device 100A". Similarly, the first processing devices 200B_1 to 200B_3 are collectively referred to as a "first processing device 200B".

The liquid discharge devices 100A_1 to 100A_3 and the first processing devices 200B_1 to 200B_3 have a one-to-one correspondence with each other. In addition, in FIG. 13, three liquid discharge devices 100A_1 to 100A_3 and three first processing devices 200B_1 to 200B_3 are described, but this is an example. The liquid discharge system 10B has any number of sets of the liquid discharge device 100A and the first processing device 200B.

In the liquid discharge system 10B, the liquid discharge device 100A is connected to each of the first processing device 200B and the server 300 so as to be communicable with each other in a wireless or wired manner. The communication network NW including the Internet may intervene in the connection.

Further, as shown in FIG. 13, the first information D1 and the second information D2 are transmitted from the liquid discharge device 100A to the server 300. On the other hand, the third information D3 is transmitted to the liquid discharge device 100A from the server 300. Further, the third information D3 is transmitted to the first processing device 200B from the liquid discharge device 100A.

3-2. Configuration of Liquid Discharge Device

Figure 14:
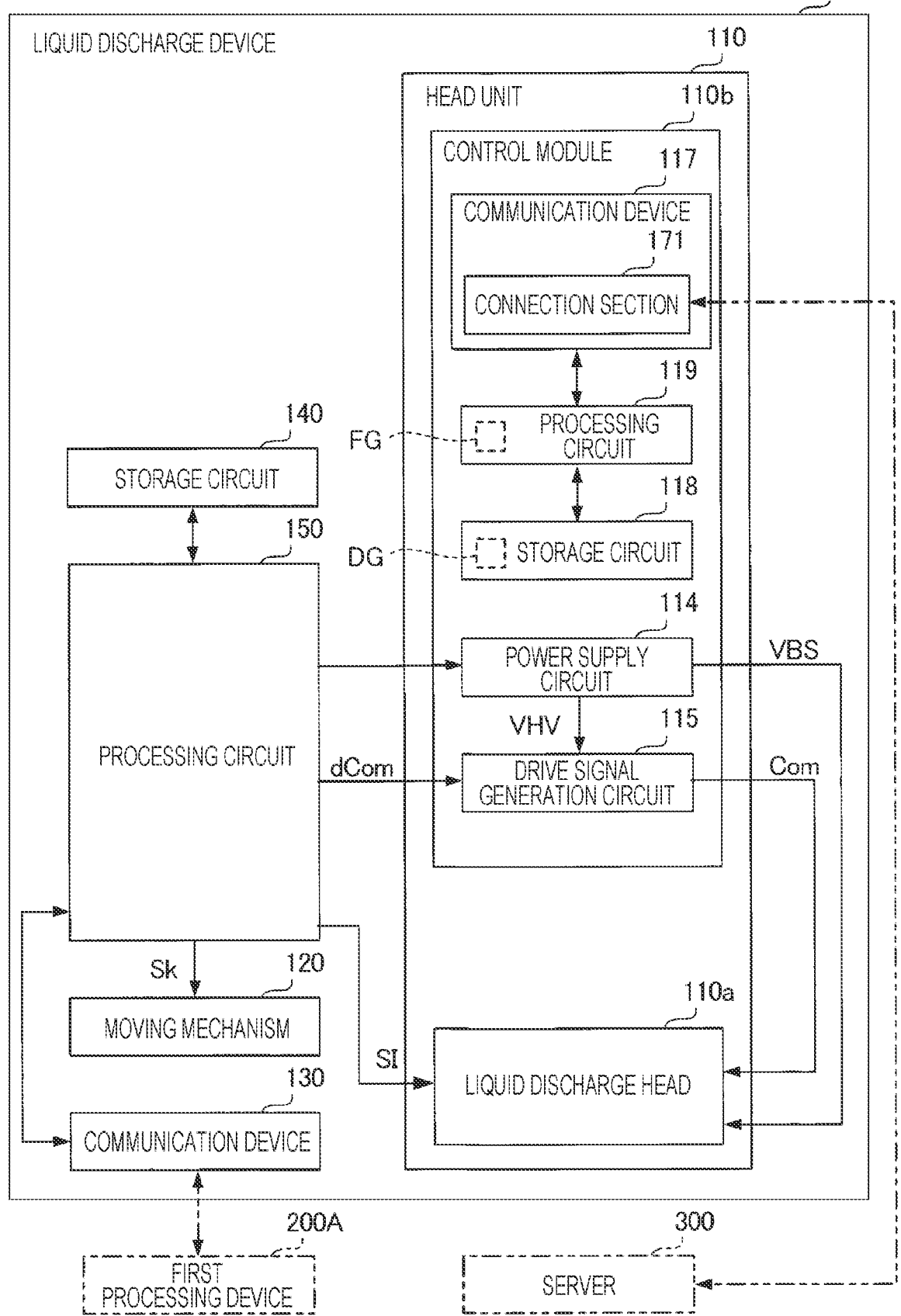
FIG. 14 is a schematic diagram showing a configuration example of a liquid discharge device used in the liquid discharge system according to the third embodiment.

FIG. 14 is a schematic diagram showing a configuration example of the liquid discharge device 100A used in the liquid discharge system 10B according to the third embodiment. Compared to the liquid discharge device 100 according to the first embodiment, the liquid discharge device 100A is different from the liquid discharge device 100 in a fact that the control module 110b has a communication device 117, a storage circuit 118, and a processing circuit 119.

The communication device 117 is a circuit that is communicably connected to the server 300. For example, the communication device 117 is an interface such as a wireless or wired LAN or USB. Further, the communication device 117 transmits the first information D1 and the second information D2, and receives the third information D3 by communicating with the server 300. That is, the communication device 117 functions as a connection section 171 that is communicably connected to the server 300. The communication device 117 may be integrated with the processing circuit 119. The connection section 171 is an example of the first connection section.

Similar to the storage circuit 240 of the first processing device 200 according to the first embodiment, the storage circuit 118 of the present embodiment stores the data set DG. A part or all of the data set DG may be stored in an external storage device of the liquid discharge device 100A, the server, or the like.

Similar to the processing circuit 250 of the first processing device 200 according to the first embodiment, the processing circuit 119 operates as a functional section FG by reading the program PG1 from the storage circuit 118 or the storage circuit 140 and executing the program PG1.

The acquisition section 251 acquires the first information D1 from the storage circuit 118. Further, the acquisition section 251 acquires the second information D2 from the storage circuit 118. The acquisition section 251 is an example of the first acquisition section.

The transmission section 252 causes the connection section 171 to transmit the acquired first information D1 and second information D2 to the server 300. Further, the transmission section 152 causes the communication device 130 to transmit the third information D3 stored in the storage circuit 140 to the first processing device 200A. The transmission section 252 is an example of the first transmission section.

The reception section 253 causes the connection section 171 to receive the third information D3 from the server 300. Further, the reception section 253 stores the received third information D3 in the storage circuit 118. The reception section 253 is an example of the second reception section.

3-3. Configuration of First Processing Device

Figure 15:
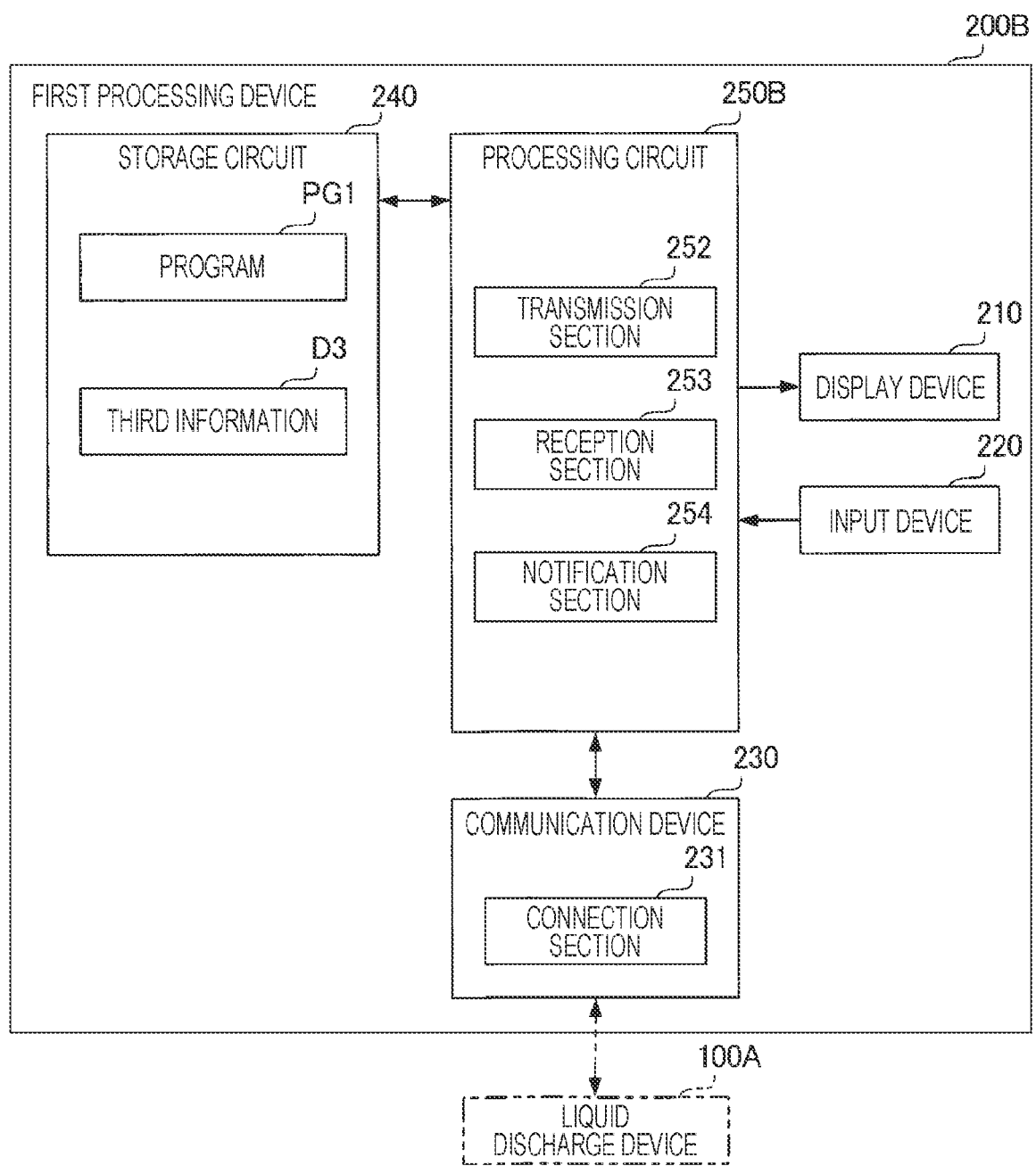
FIG. 15 is a schematic diagram showing a configuration example of a first processing device used in the liquid discharge system according to the third embodiment.

FIG. 15 is a schematic diagram showing a configuration example of the first processing device 200B used in the liquid discharge system 10B according to the third embodiment. Compared to the first processing device 200 according to the first embodiment, the first processing device 200B is different from the first processing device 200 in a fact that the first processing device 200B does not require the storage of the first information D1 and the second information D2 by the storage circuit 240 and has a processing circuit 250B instead of the processing circuit 250.

Compared to the processing circuit 250 according to the first embodiment, the processing circuit 250B differs from the processing circuit 250 in a fact that the acquisition section 251 is not an essential component.

3-4. Process of Liquid Discharge System

Figure 16:
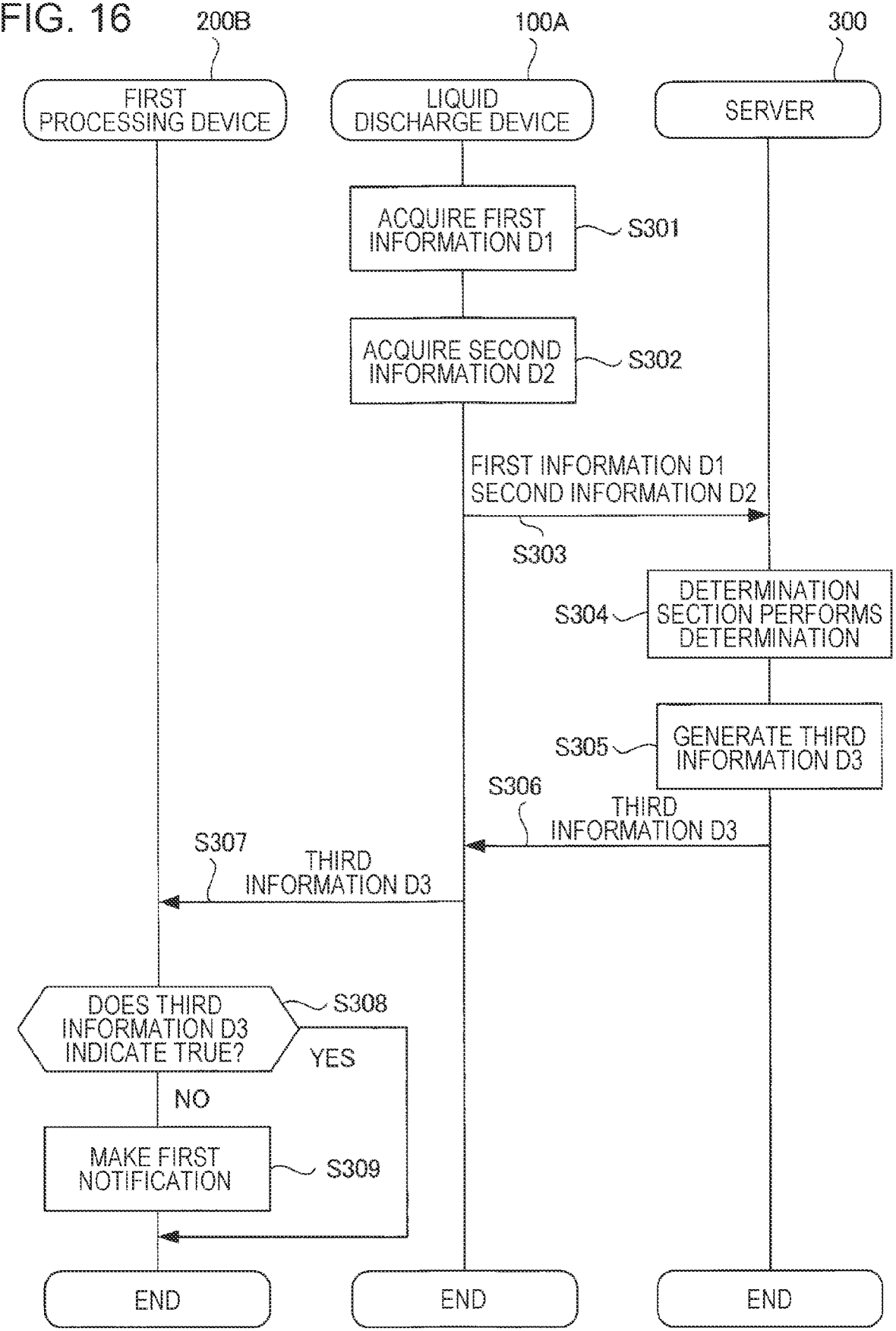
FIG. 16 is a flowchart showing a process of the liquid discharge system according to the third embodiment.

FIG. 16 is a flowchart showing the process of the liquid discharge system 10B according to the third embodiment.

In step S301, the processing circuit 119 of the liquid discharge device 100A functions as the acquisition section 251 to acquire the first information D1.

In step S302, the processing circuit 119 of the liquid discharge device 100A functions as the acquisition section 251 to acquire the second information D2.

In step S303, the processing circuit 119 of the liquid discharge device 100A functions as the transmission section 252 to transmit the first information D1 and the second information D2 to the server 300. Further, the processing circuit 350 of the server 300 functions as the reception section 351 to receive the first information D1 and the second information D2.

In step S304, the processing circuit 350 of the server 300 functions as the determination section 352 to determine whether or not the correspondence relationship between the first information D1 and the second information D2 is stored in the server 300 in advance.

In step S305, the processing circuit 350 of the server 300 functions as the determination section 352 to generate the third information D3 indicating the determination result.

In step S306, the processing circuit 350 of the server 300 functions as the transmission section 353 to transmit the third information D3 to the liquid discharge device 100A. After that, the processing circuit 350 of the server 300 ends all the processes. Further, the processing circuit 150 of the liquid discharge device 100A functions as the reception section 153 to receive the third information D3.

In step S307, the processing circuit 150A of the liquid discharge device 100A functions as the transmission section 152 to transmit the third information D3 to the first processing device 200B. After that, the processing circuit 150A of the liquid discharge device 100A ends all the processes. Further, the processing circuit 250B of the first processing device 200B functions as the reception section 253 to receive the third information D3.

When the third information D3 indicates true, that is, when YES in step S308, the processing circuit 250B of the first processing device 200B ends all the processes. When the third information D3 indicates false, that is, when NO in step S308, the processing circuit 250B of the first processing device 200B executes the process of step S309.

In step S309, the processing circuit 250B of the first processing device 200B functions as the notification section 254 to output the first notification related to the liquid discharge device 100A to the outside of the first processing device 200B based on the third information D3. After that, the processing circuit 250B of the first processing device 200B ends all the processes.

3-5. Effect of Liquid Discharge System

In the liquid discharge system 10B according to the present embodiment, the liquid discharge device 100A has a connection section 171 that can be connected to the server 300 via the network. The transmission section 252 causes the connection section 171 to transmit the first information D1 and the second information D2 to the server 300. The reception section 253 causes the connection section 171 to receive the third information D3 from the server 300.

By having the configuration, the liquid discharge system 10B can directly transmit the first information D1 and the second information D2 to the server 300 from the liquid discharge device 100A.

4. Fourth Embodiment

Hereinafter, a fourth embodiment of the present disclosure will be described. For elements whose actions or functions are the same as in the first embodiment in the embodiment exemplified below, the reference numerals used in the description of the first embodiment will be used and detailed description of each will be omitted as appropriate.

4-1. Outline of Liquid Discharge System

Figure 17:
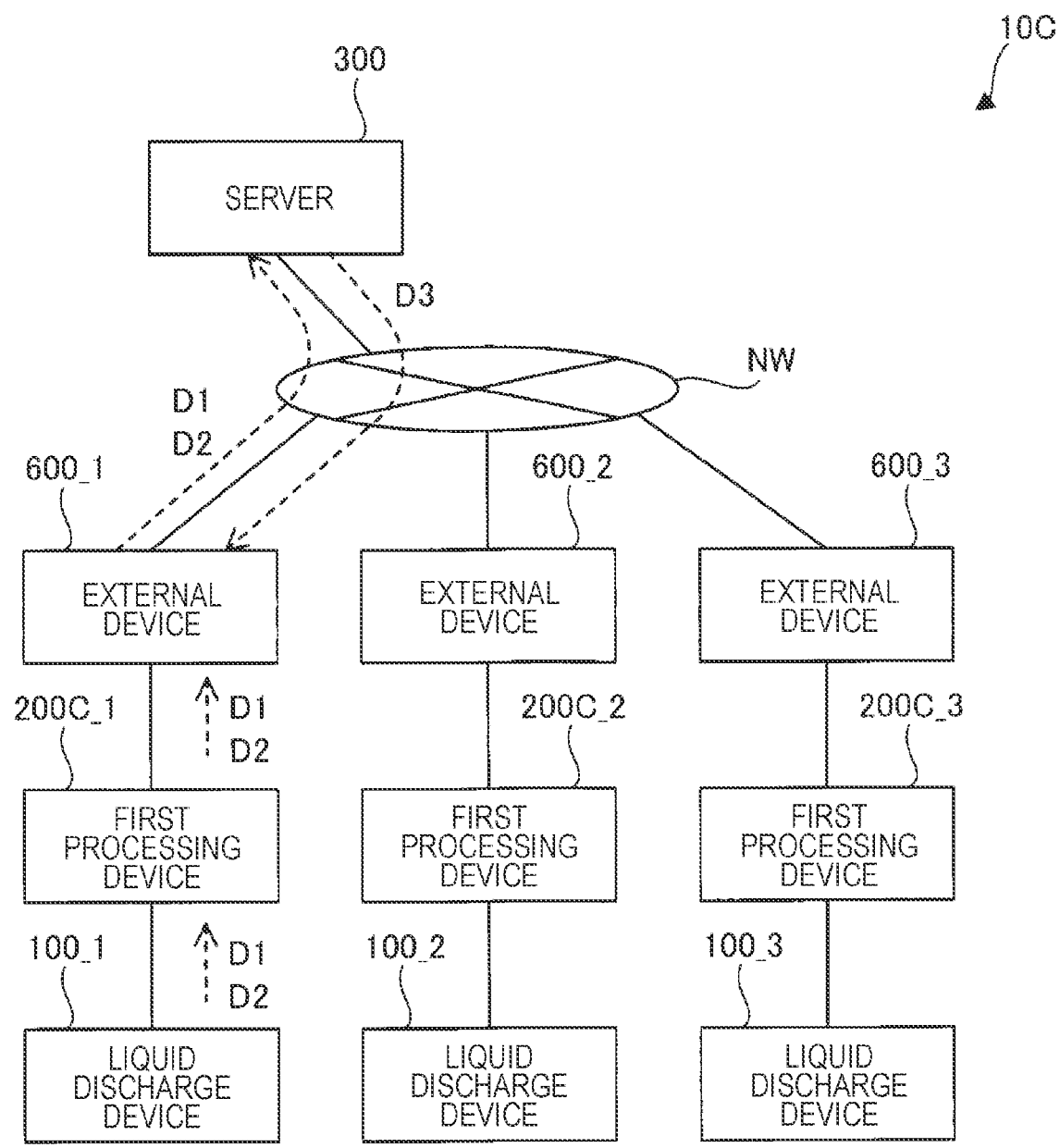
FIG. 17 is a schematic diagram showing a configuration example of a liquid discharge system according to a fourth embodiment.

FIG. 17 is a schematic diagram showing a configuration example of the liquid discharge system 10C according to the fourth embodiment. In the example shown in FIG. 17, the liquid discharge system 10C has liquid discharge devices 100_1 to 100_3, first processing devices 200C_1 to 200C_3, external devices 600_1 to 600_3, and a server 300. In the following, the first processing devices 200C_1 to 200C_3 are collectively referred to as a "first processing device 200C". Similarly, the external devices 600_1 to 600_3 are collectively referred to as an "external device 600".

The liquid discharge devices 100_1 to 100_3, the first processing devices 200C_1 to 200C_3, and the external devices 600_1 to 600_3 have a one-to-one correspondence with each other. In FIG. 17, three liquid discharge devices 100_1 to 100_3, three first processing devices 200C_1 to 200C_3, and three external devices 600_1 to 600_3 are described, but this is an example. The liquid discharge system 10C has any number of sets of the liquid discharge device 100, the first processing device 200C, and the external device 600.

In the liquid discharge system 10C, the first processing device 200C is connected to each of the liquid discharge device 100 and the external device 600 so as to be communicable with each other in a wireless or wired manner. Further, the external device 600 is connected to each of the first processing device 200C and the server 300 so as to be able to communicate with each other in a wireless or wired manner. The communication network NW including the Internet may intervene in the connection.

Further, as shown in FIG. 17, the first information D1 and the second information D2 are transmitted to the first processing device 200C from the liquid discharge device 100A. Further, the first information D1 and the second information D2 are transmitted to the external device 600 from the first processing device 200C. Further, the first information D1 and the second information D2 are transmitted to the server 300 from the external device 600. On the other hand, the third information D3 is transmitted to the external device 600 from the server 300.

4-2. Configuration of First Processing Device

Figure 18:
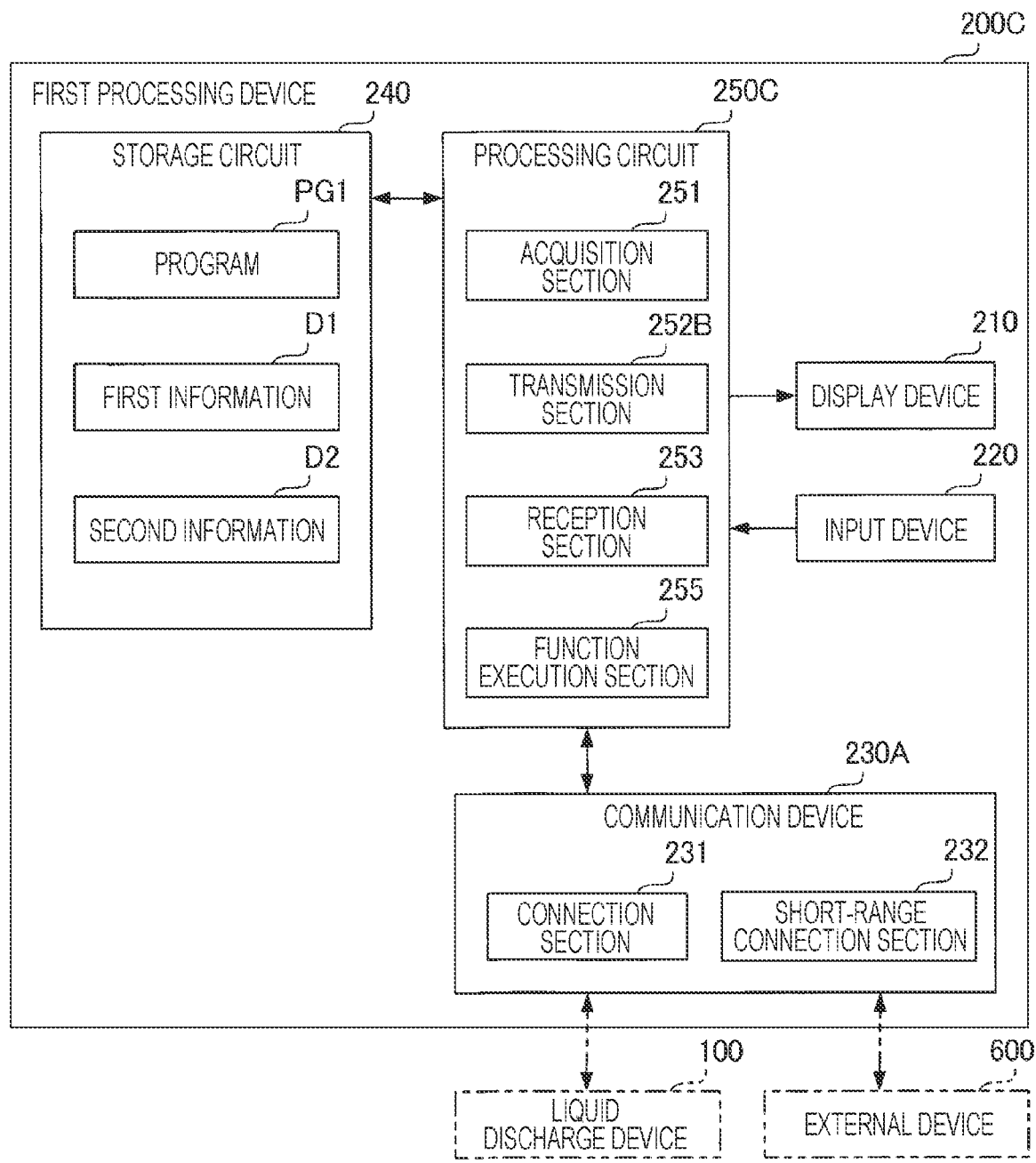
FIG. 18 is a schematic diagram showing a configuration example of a first processing device used in the liquid discharge system according to the fourth embodiment.

FIG. 18 is a schematic diagram showing a configuration example of the first processing device 200C used in the liquid discharge system 10C according to the fourth embodiment. Compared to the first processing device 200 according to the first embodiment, the first processing device 200C is different from the first processing device 200 in a fact that the first processing device 200C does not require the storage of the third information D3 by the storage circuit 240, has a processing circuit 250C instead of the processing circuit 250, and has a communication device 230A instead of the communication device 230.

The communication device 230A is a circuit that is connected to the liquid discharge device 100 and the external device 600 so as to be able to communicate with each other. For example, the communication device 230A is an interface such as a wireless or wired LAN or USB. Further, the communication device 230A receives the first information D1 and the second information D2 by communicating with the liquid discharge device 100. That is, the communication device 230A functions as a connection section 231 that is communicably connected to the liquid discharge device 100. Further, the communication device 230A transmits the first information D1 and the second information D2 by short-range wireless communication with the external device 600. That is, the communication device 230A functions as a short-range connection section 232 that is communicably connected to the external device 600. Here, the short-range wireless communication is realized according to specifications such as Bluetooth, Bluetooth Low Energy (BLE), and Near Field Communication (NFC). Bluetooth is a registered trademark. The communication device 230A may be integrated with the processing circuit 250C.

Compared to the processing circuit 250 according to the first embodiment, the processing circuit 250C is different from the processing circuit 250 in a fact that the processing circuit 250C has a transmission section 252B instead of the transmission section 252, and further has the function execution section 255 included in the processing circuit 250A according to the second embodiment.

The transmission section 252B causes the short-range connection section 232 to transmit the acquired first information D1 and second information D2 to the external device 600. The transmission section 252B is an example of the first transmission section.

4-3. Configuration of External Device

Figure 19:
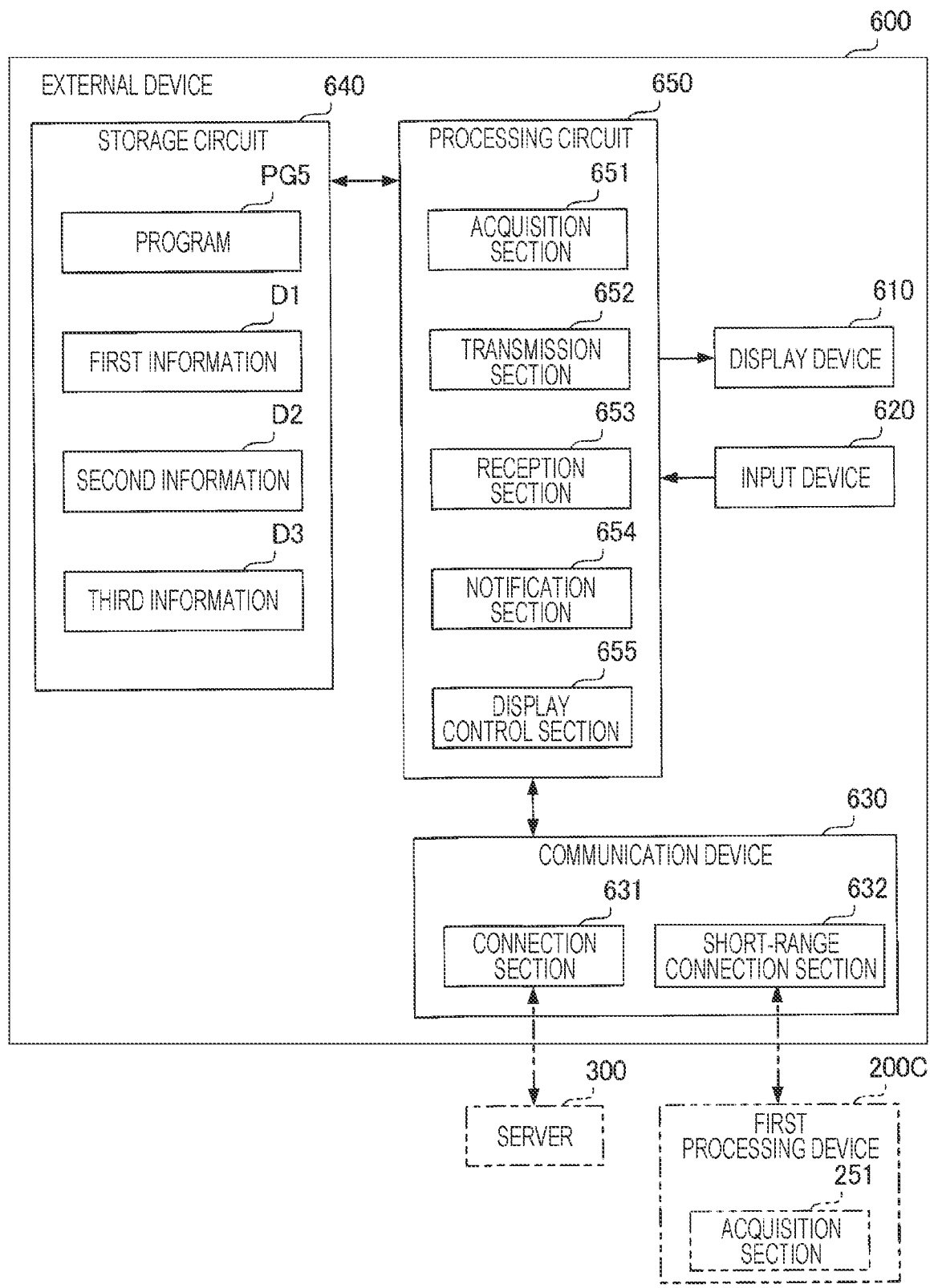
FIG. 19 is a schematic diagram showing a configuration example of an external device used in the liquid discharge system according to the fourth embodiment.

FIG. 19 is a schematic diagram showing a configuration example of the external device 600 used in the liquid discharge system 10C according to the fourth embodiment. The external device 600 is, for example, a mobile terminal such as a smartphone or a tablet, and is assumed to be used by the user of the liquid discharge device 100. When a liquid discharge head 110a included in the liquid discharge device 100 is not a regular product, the external device 600 notifies that the liquid discharge head 110a is not a regular product.

As shown in FIG. 19, the external device 600 has a display device 610, an input device 620, a communication device 630, a storage circuit 640, and a processing circuit 650. The devices are communicably connected to each other.

The display device 610 displays various images under the control of the processing circuit 650. Here, the display device 610 has, for example, various display panels such as a liquid crystal display panel or an organic EL display panel. The display device 610 may be provided at the outside of the external device 600.

The input device 620 is a machine that accepts an operation from the user. For example, the input device 620 has a pointing device such as a touch pad, a touch panel, or a mouse. Here, when the input device 620 has the touch panel, the input device 620 may also serve as the display device 610. The input device 620 may be provided at the outside of the external device 600.

The communication device 630 is a circuit communicably connected to the first processing device 200C and the server 300. For example, the communication device 630 is an interface such as a wireless or wired LAN or USB. Further, the communication device 630 receives the third information D3 by communicating with the server 300. That is, the communication device 630 functions as a connection section 631 that is communicably connected to the server 300. Further, the communication device 630 receives the first information D1 and the second information D2 by short-range wireless communication with the first processing device 200C. That is, the communication device 630 functions as a short-range connection section 632 that is communicably connected to the first processing device 200C. The communication device 630 may be integrated with the processing circuit 650.

The storage circuit 640 is a device that stores various programs executed by the processing circuit 650 and various data processed by the processing circuit 650. The storage circuit 640 has, for example, a hard disk drive or a semiconductor memory. A part or all of the storage circuit 640 may be provided in an external storage device of the external device 600, the server, or the like.

The storage circuit 640 of the present embodiment stores a program PG5, the first information D1, the second information D2, and the third information D3. A part or all of the program PG5, the first information D1, the second information D2, and the third information D3 may be stored in an external storage device of the external device 600, the server, or the like.

The processing circuit 650 is a device having a function of controlling each section of the external device 600 and a function of processing various data. The processing circuit 650 has, for example, a processor such as the CPU. The processing circuit 650 may be configured by a single processor or may be configured by a plurality of processors. Further, a part or all of the functions of the processing circuit 650 may be realized by hardware such as DSP, ASIC, PLD, and FPGA.

The processing circuit 650 functions as an acquisition section 651, a transmission section 652, a reception section 653, a notification section 654, and a display control section 655 by reading the program PG5 from the storage circuit 640 and executing the program PG5.

The acquisition section 651 acquires the first information D1 and the second information D2 by communicating with the first processing device 200C using the short-range connection section 632. The acquisition section 651 stores the acquired first information D1 and second information D2 in the storage circuit 640. The acquisition section 651 is an example of a second acquisition section.

The transmission section 652 causes the connection section 631 to transmit the acquired first information D1 and second information D2 to the server 300. The transmission section 652 is an example of the first transmission section.

The reception section 653 causes the connection section 631 to receive the third information D3 from the server 300. Further, the reception section 653 stores the received third information D3 in the storage circuit 640. The reception section 653 is an example of a second reception section.

The notification section 654 outputs the notification related to the liquid discharge device 100 to the display control section 655 based on the third information D3. The notification may be, for example, a notification to urge the user of the liquid discharge device 100 about the use of the regular liquid discharge head 110a. Alternatively, the notification may be, for example, a notification to prompt the user of the liquid discharge device 100 to make an inquiry to the manufacturer of the liquid discharge device 100. The notification section 254 is an example of the first notification section. Further, the notification is an example of the first notification.

The display control section 655 causes the display device 610 to display a display for inputting the first information D1 and the second information D2 to the user of the liquid discharge device 100. The user of the liquid discharge device 100 inputs the first information D1 and the second information D2 from the input device 620 based on the display displayed on the display device 210. The acquisition section 651 acquires the first information D1 and the second information D2 input from the input device 620. As described above, the acquisition section 651 may acquire the first information D1 and the second information D2 by communicating with the first processing device 200C using the short-range connection section 632.

Further, the display control section 256 causes the display device 210 to display the notification received from the notification section 654.

Figure 20A:
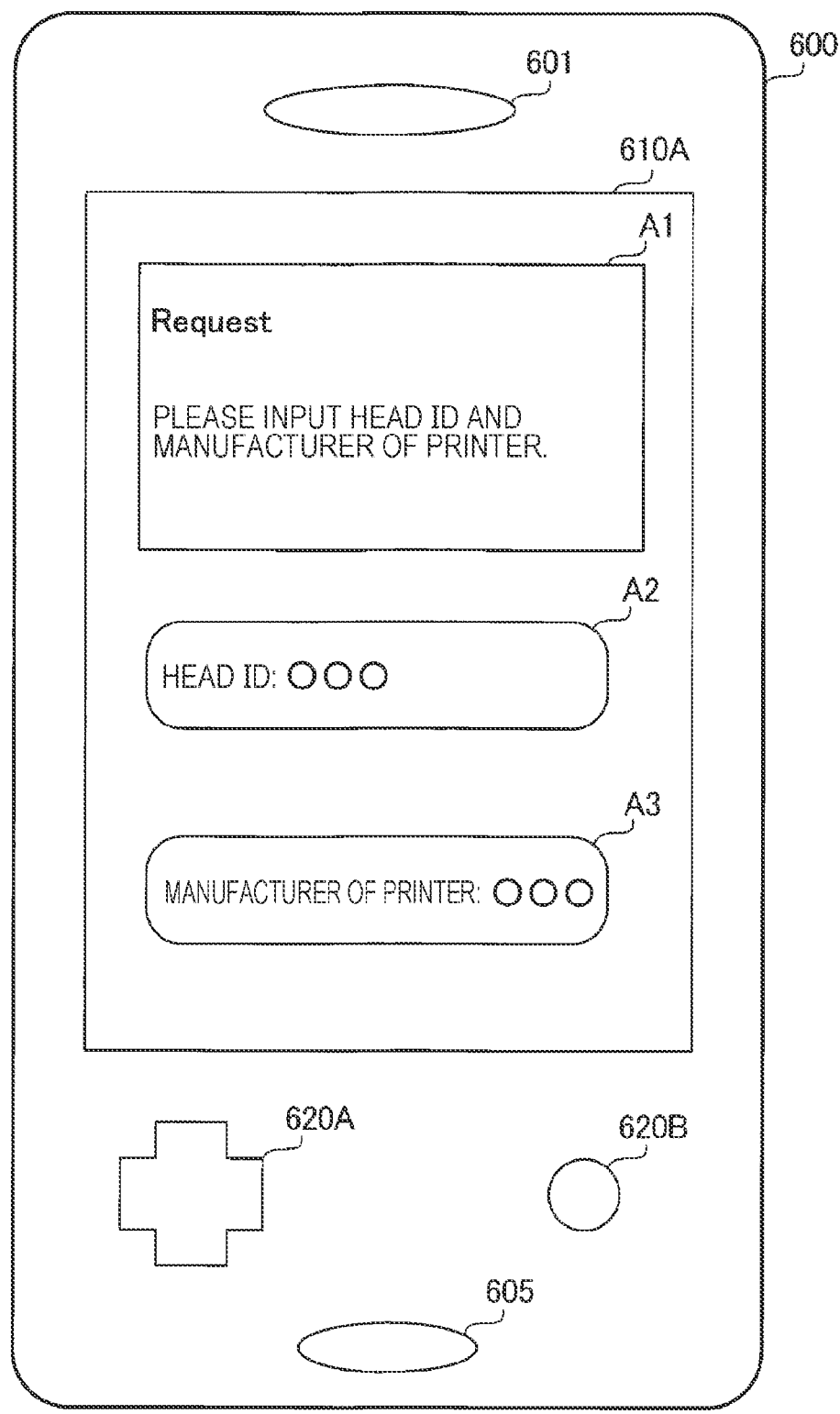
FIG. 20A is a diagram showing an example of a display screen in the external device according to the fourth embodiment.
Figure 20B:
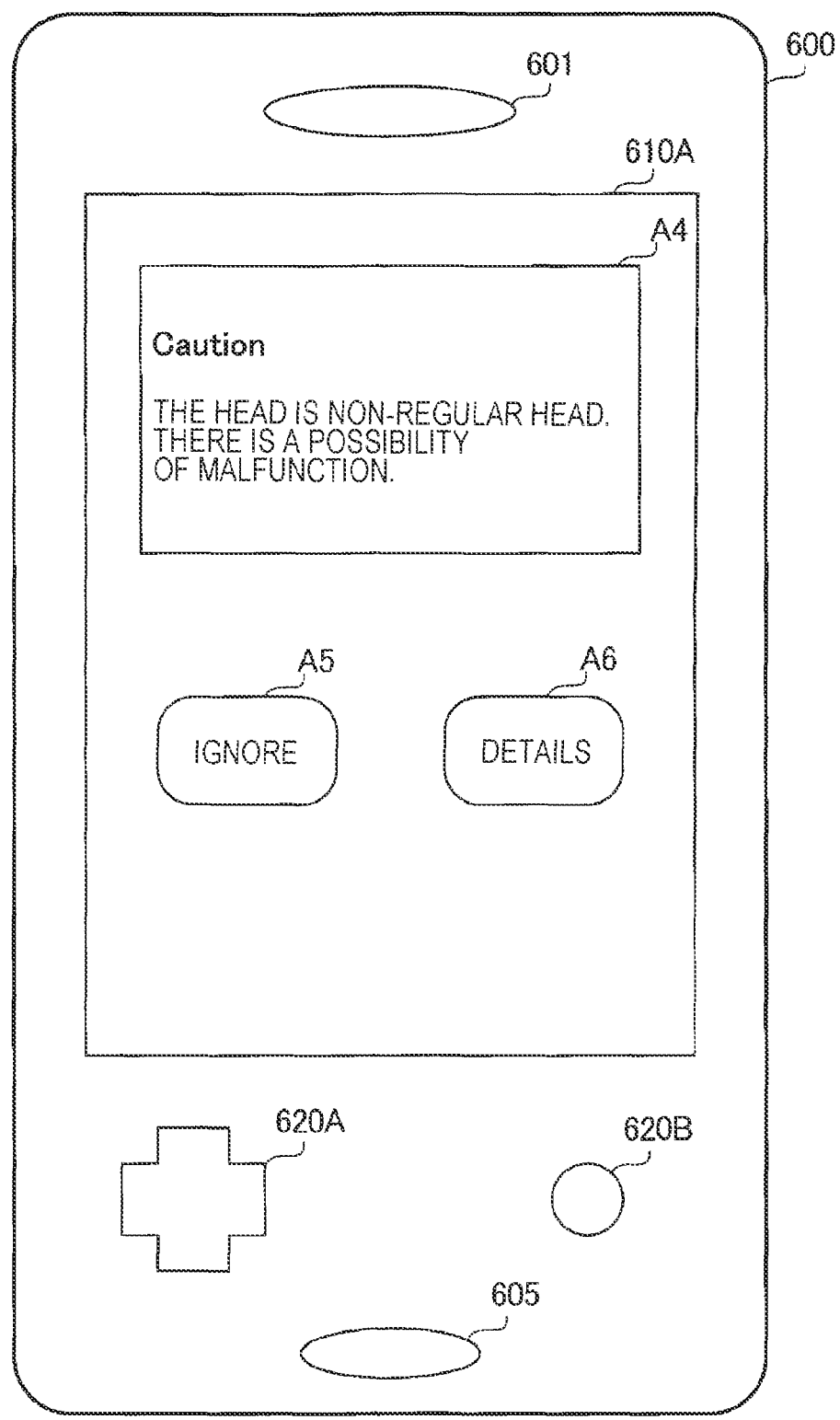
FIG. 20B is a diagram showing an example of a display screen in the external device according to the fourth embodiment.
Figure 20C:
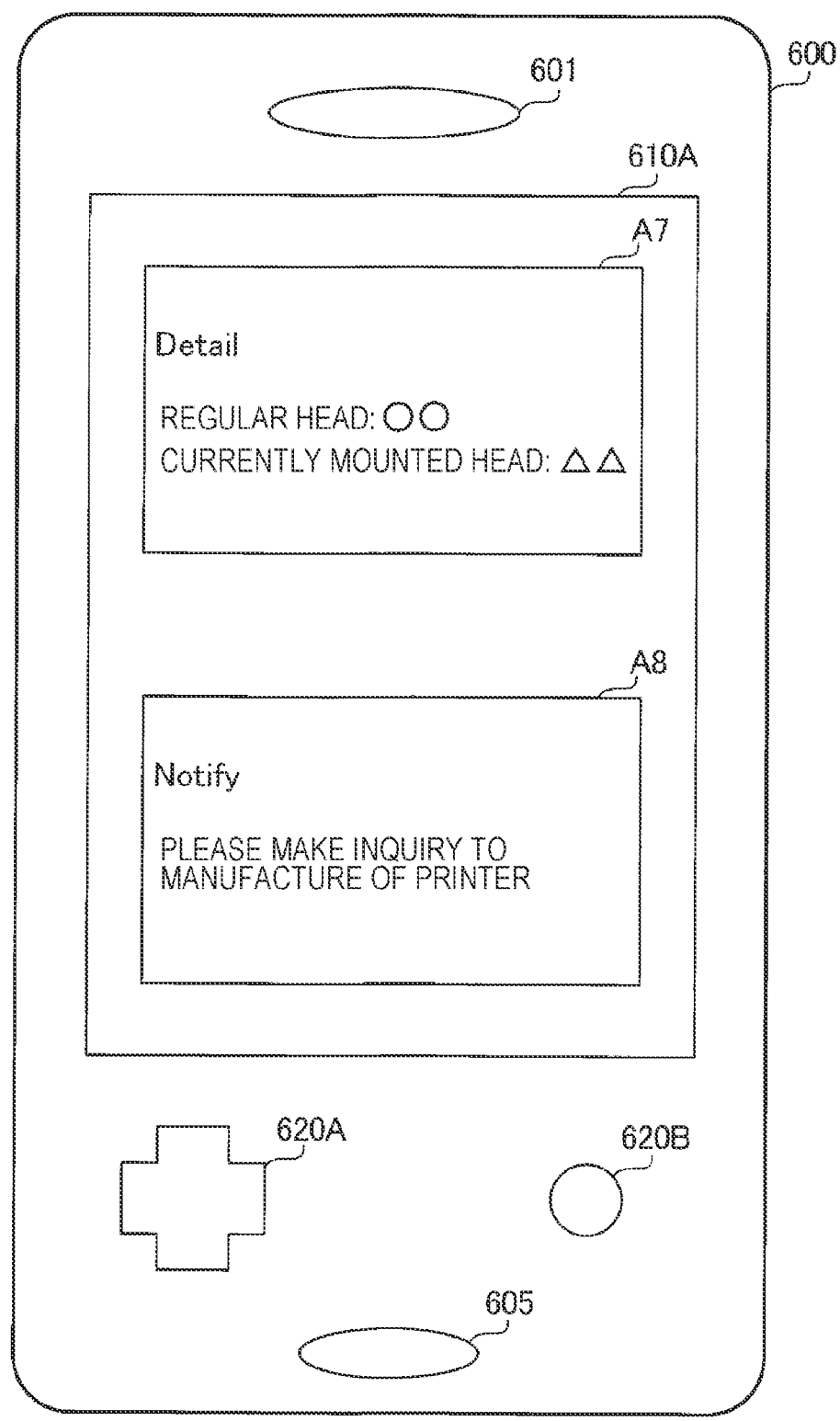
FIG. 20C is a diagram showing an example of the display screen in the external device according to the fourth embodiment.

FIGS. 20A to 20C show an example of a display screen in the external device 600. As shown in FIG. 20A, the external device 600 includes a sound generation section 601, a sound acceptance section 605, a display 610A as the display device 610 and the input device 620, and a selection button 620A and a decision button 620B as the input device 620. The sound generation section 601 is a sound emitting device, which is a device that transmits information to the user of the external device 600 by voice. The sound acceptance section 605 is a sound collecting device, which is a device that converts the voice of the user of the external device 600 into a voice signal and inputs the voice signal obtained through the conversion. The display 610A is a device that transmits information to the user of the external device 600 using text and an image. Further, a touch panel is laminated on the surface of the display 610A, and the touch panel accepts the input from the user of the external device 600 by a finger or a stylus pen. The selection button 620A is, for example, a cross key, and accepts an operation for instructing to switch an input field displayed on the display 610A as an example. As an example, the decision button 620B accepts an operation for instructing to confirm the input content by the user of the external device 600.

FIG. 20A is an example of a display screen for prompting the user of the external device 600 to input the serial number of the liquid discharge head 110a and the manufacturer name of the liquid discharge device 100. As shown in FIG. 20A, the display 610A displays a message A1 for prompting the input of the serial number and the manufacturer name, a serial number input field A2, and a manufacturer name input field A3. The user of the external device 600 inputs the serial number of the liquid discharge head 110a into the input field A2 by using, for example, a soft keyboard. After that, the user of the external device 600 switches the input field to be the target of input to the input field A3 by using the selection button 620A or touching the input field A3. Next, the user of the external device 600 inputs the manufacturer name of the liquid discharge device 100 into the input field A3 by using, for example, a soft keyboard. Finally, the user of the external device 600 completes the input by pressing the decision button 620B. By the procedures, the information input in the input field A2 is acquired by the acquisition section 651 as the first information D1. Further, the information input in the input field A3 is acquired by the acquisition section 651 as the second information D2.

FIG. 20B is an example of a display screen for notifying the user of the external device 600 that the liquid discharge head 110a used to manufacture the liquid discharge device 100 by the manufacturer of the liquid discharge device 100 is not a regular product. As shown in FIG. 20B, the display 610A is displayed with a message A4 for transmitting the notification, a soft button A5 for instructing to ignore the message A4, and a soft button A6 for displaying the details of the message A4. When the user of the external device 600 presses the soft button A5, the message A4, the soft button A5, and the soft button A6 disappear from the display 610A. Alternatively, a signal indicating that the soft button A5 has been pressed is transmitted to the first processing device 200C from the external device 600, and the function execution section 255 of the first processing device 200C may perform a process of not permitting a part or all of the functions of the liquid discharge device 100. When the user of the external device 600 presses the soft button A6, a display screen illustrated in FIG. 20C which will be described later is displayed.

FIG. 20C is an example of a display screen for making a notification to prompt the user of the external device 600 to make an inquiry to the manufacturer of the liquid discharge device 100. As shown in FIG. 20C, the display 610A is displayed with a message A7 for specifying the manufacturer name of the regular liquid discharge head 110a to be mounted on the liquid discharge device 100, and the manufacturer name of the liquid discharge head 110a currently mounted on the liquid discharge device 100. Further, the display 610A is displayed with s a message A8 for prompting to make an inquiry to the manufacturer of the liquid discharge device 100.

The display screens shown in FIGS. 20A to 20C are examples of the display screens displayed on the display 610A, and the display screens are not limited thereto. For example, the display 610A may be displayed with a message urging the user of the liquid discharge device 100 to use the regular liquid discharge head 110a.

4-4. Process of Liquid Discharge System

FIG. 21 is a flowchart showing a process of the liquid discharge system 10C according to the fourth embodiment.

In step S401, the processing circuit 250C of the first processing device 200C functions as the acquisition section 251 to acquire the first information D1.

In step S402, the processing circuit 250C of the first processing device 200C functions as the acquisition section 251 to acquire the second information D2.

In step S403, the processing circuit 250C of the first processing device 200C functions as the transmission section 252B to transmit the first information D1 and the second information D2 to the external device 600. After that, the processing circuit 250C of the first processing device 200C ends all the processes. Further, the processing circuit 650 of the external device 600 functions as the acquisition section 651 to acquire the first information D1 and the second information D2.

In step S404, the processing circuit 650 of the external device 600 functions as the transmission section 652 to transmit the first information D1 and the second information D2 to the server 300. Further, the processing circuit 350 of the server 300 functions as the reception section 351 to receive the first information D1 and the second information D2.

In step S405, the processing circuit 350 of the server 300 functions as the determination section 352 to determine whether or not the correspondence relationship between the first information D1 and the second information D2 is stored in the server 300 in advance.

In step S406, the processing circuit 350 of the server 300 functions as the determination section 352 to generate the third information D3 as the determination result.

In step S407, the processing circuit 350 of the server 300 functions as the transmission section 353 to transmit the third information D3 to the external device 600. After that, the processing circuit 350 of the server 300 ends all the processes. Further, the processing circuit 650 of the external device 600 functions as the reception section 653 to receive the third information D3.

When the third information D3 indicates true, that is, when YES in step S408, the processing circuit 650 of the external device 600 ends all the processes. When the third information D3 indicates false, that is, when NO in step S408, the processing circuit 650 of the external device 600 executes the process of step S409.

In step S409, the processing circuit 650 of the external device 600 functions as the notification section 654 to output the first notification related to the liquid discharge device 100 to the outside of the external device 600 based on the third information D3. After that, the processing circuit 650 of the external device 600 ends all the processes.

4-5. Effect of Liquid Discharge System

The liquid discharge system 10C according to the present embodiment includes the external device 600. The external device 600 has the connection section 631 that can be connected to the server 300 via the network. In the external device 600, the transmission section 652 causes the connection section 631 to transmit the first information D1 and the second information D2 to the server 300. The reception section 653 causes the connection section 631 to receive the third information D3 from the server 300.

By having the configuration, the liquid discharge system 10C can directly transmit the first information D1 and the second information D2 to the server 300 from the external device 600. Further, the external device 600 can directly receive the third information D3 from the server 300.

Further, in the liquid discharge system 10C, short-range wireless communication is possible between the first processing device 200C and the external device 600. The external device 600 has the acquisition section 651 that acquires the first information D1 via the short-range wireless communication.

When the liquid discharge system 10C has the configuration, the external device 600 can acquire the first information D1 from the first processing device 200C by short-range wireless communication.

5. Fifth Embodiment

Hereinafter, a fifth embodiment of the present disclosure will be described. For elements whose actions or functions are the same as in the first embodiment, the third embodiment, and the fourth embodiment in the embodiments exemplified below, the reference numerals used in the description of the first embodiment, the third embodiment, and the fourth embodiment will be used and detailed description of each will be omitted as appropriate.

5-1. Outline of Liquid Discharge System

Figure 22:
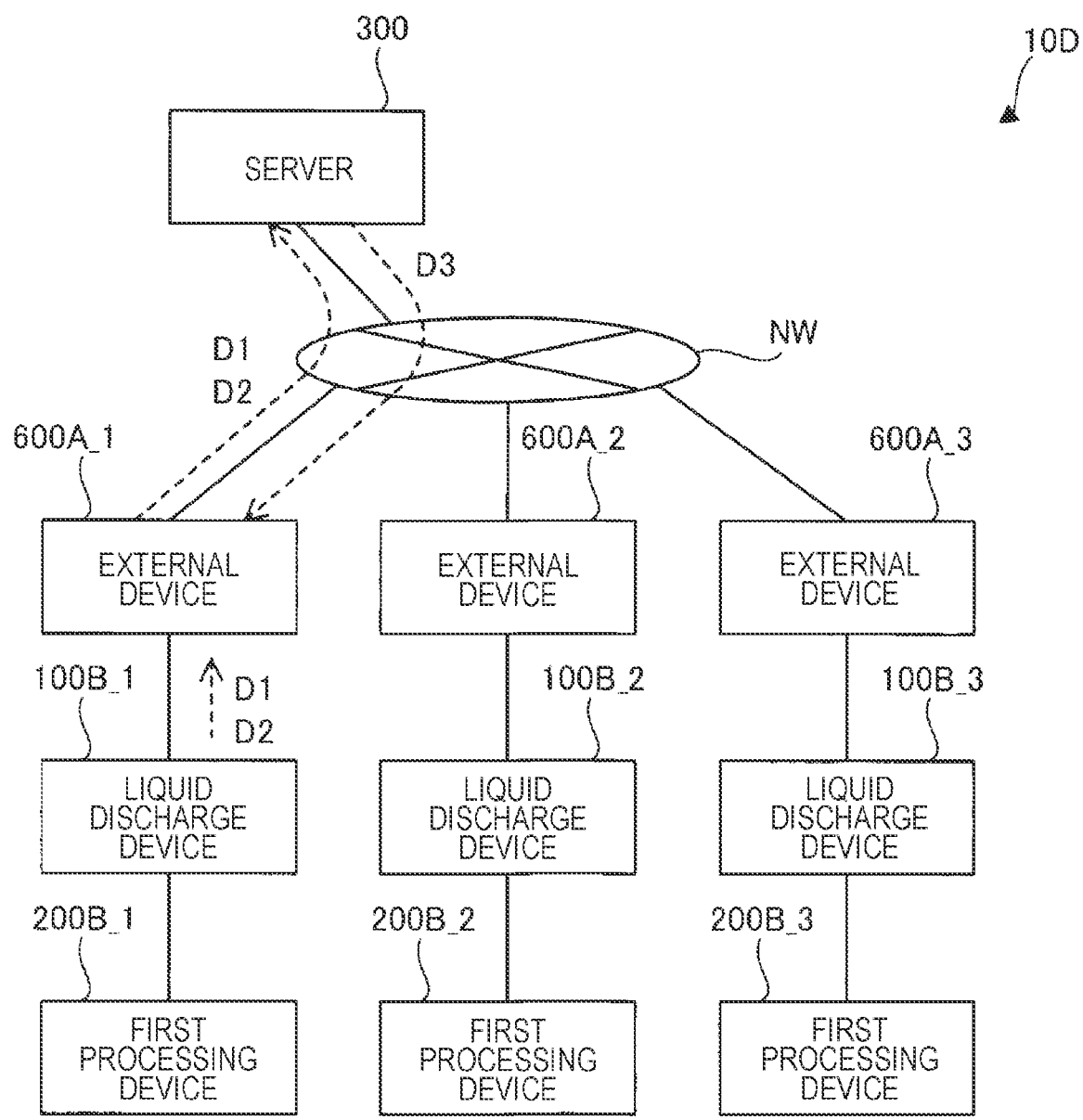
FIG. 22 is a schematic diagram showing a configuration example of a liquid discharge system according to a fifth embodiment.

FIG. 22 is a schematic diagram showing a configuration example of a liquid discharge system 10D according to the fifth embodiment. In the example shown in FIG. 22, the liquid discharge system 10D has first processing devices 200B_1 to 200B_3, liquid discharge devices 100B_1 to 100B_3, external devices 600A_1 to 600A_3, and a server 300. In the following, the liquid discharge devices 100B_1 to 100B_3 are collectively referred to as a "liquid discharge device 100B". Similarly, the external devices 600A_1 to 600A_3 are collectively referred to as an "external device 600A".

The first processing devices 200B_1 to 200B_3, the liquid discharge devices 100B_1 to 100B_3, and the external devices 600A_1 to 600A_3 have a one-to-one correspondence with each other. In FIG. 22, three first processing devices 200B_1 to 200B_3, three liquid discharge devices 100B_1 to 100B_3, and three external devices 600A_1 to 600A_3 are described, but this is an example. The liquid discharge system 10D has any number of sets of the first processing device 200B, the liquid discharge device 100B, the first processing device 200C, and the external device 600A.

In the liquid discharge system 10D, the liquid discharge device 100B is connected to each of the first processing device 200B and the external device 600A so as to be communicable with each other in a wireless or wired manner. Further, the external device 600A is connected to each of the liquid discharge device 100B and the server 300 so as to be communicable with each other in a wireless or wired manner. The communication network NW including the Internet may intervene in the connection.

Further, as shown in FIG. 22, the first information D1 and the second information D2 are transmitted to the external device 600A from the liquid discharge device 100B. Further, the first information D1 and the second information D2 are transmitted to the server 300 from the external device 600A. On the other hand, the third information D3 is transmitted to the external device 600A from the server 300.

5-2. Configuration of Liquid Discharge Device

Figure 23:
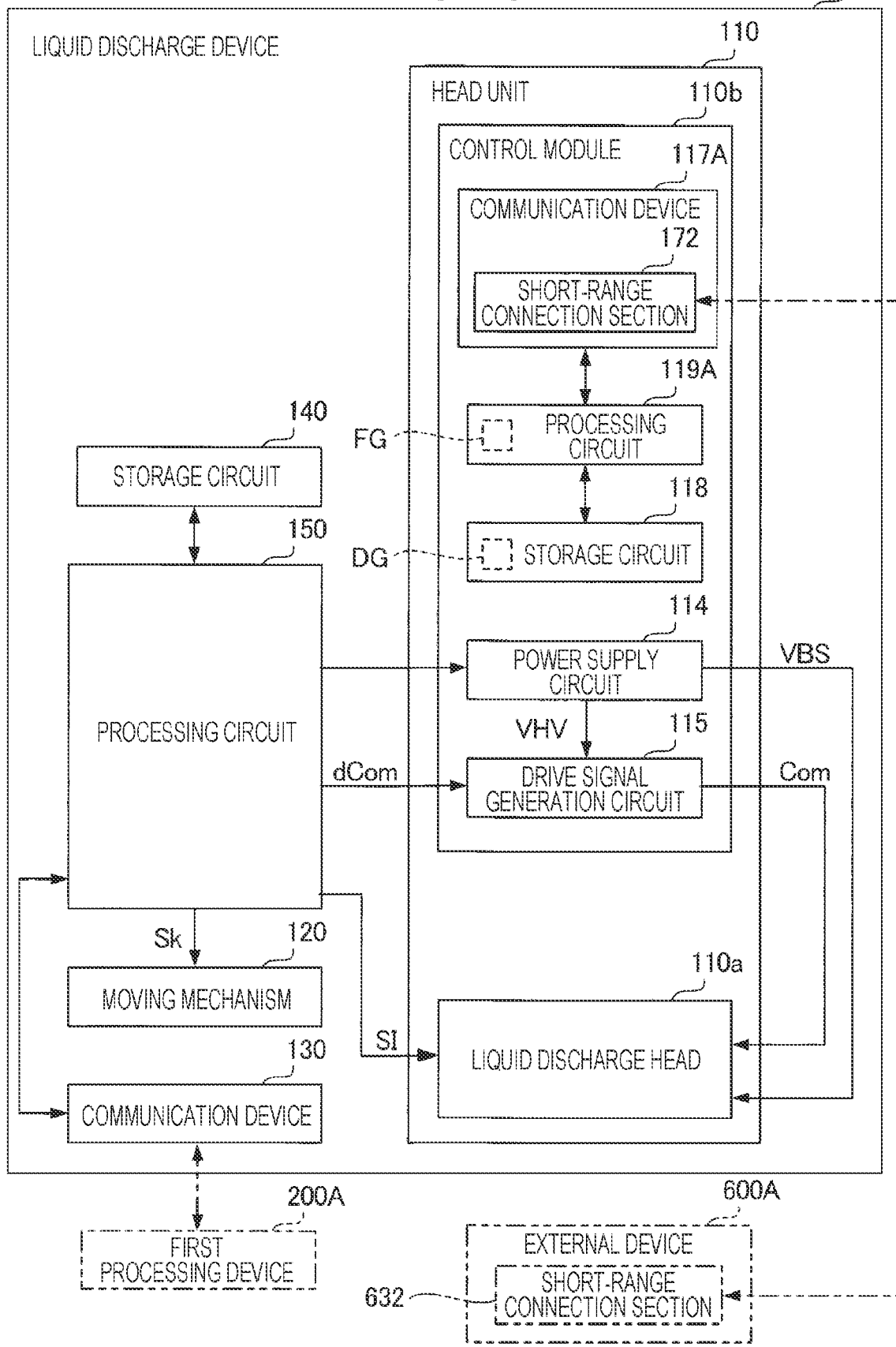
FIG. 23 is a schematic diagram showing a configuration example of a liquid discharge device used in the liquid discharge system according to the fifth embodiment.

FIG. 23 is a schematic diagram showing a configuration example of the liquid discharge device 100B used in the liquid discharge system 10D according to the fifth embodiment. Compared to the liquid discharge device 100A according to the third embodiment, the liquid discharge device 100B is different from the liquid discharge device 100A in a fact that the liquid discharge device 100B has a communication device 117A instead of the communication device 117 and has a processing circuit 119A instead of the processing circuit 119.

The communication device 117A is a circuit that is communicably connected to the external device 600A. For example, the communication device 117A is an interface such as a wireless or wired LAN or USB. Further, the communication device 117A transmits the first information D1 and the second information D2 by short-range communication with the external device 600A. That is, the communication device 117A functions as a short-range connection section 172 that is communicably connected to the external device 600A.

Compared to the processing circuit 119 according to the third embodiment, the processing circuit 119A is different from the processing circuit 119 in a fact that the transmission section 252 causes the short-range connection section 172 to transmit the acquired first information D1 and second information D2 to the external device 600A. The transmission section 252 is an example of the first transmission section.

5-3. Configuration of External Device

Figure 24:
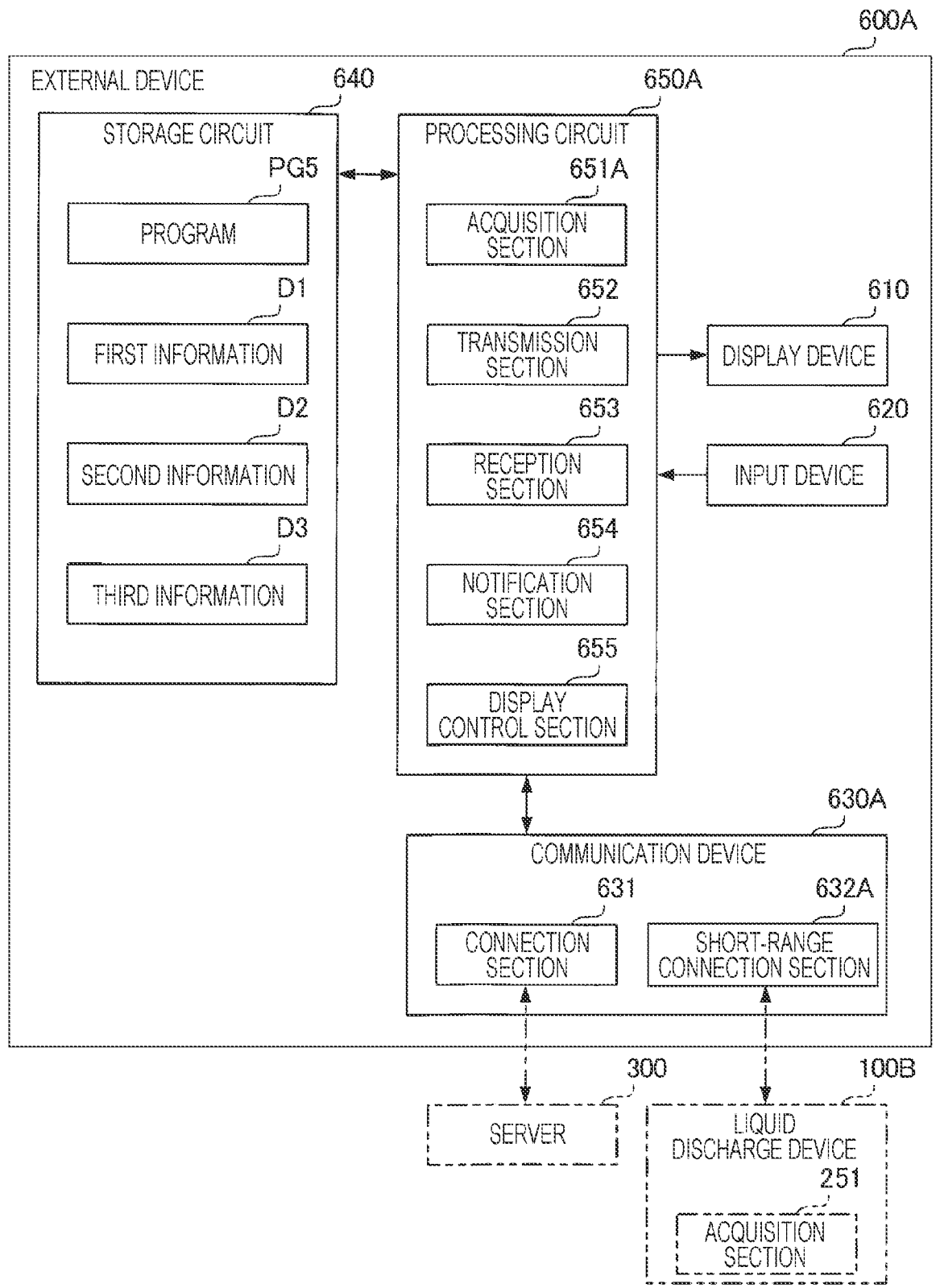
FIG. 24 is a schematic diagram showing a configuration example of an external device used in the liquid discharge system according to the fifth embodiment.

FIG. 24 is a schematic diagram showing a configuration example of the external device 600A used in the liquid discharge system 10D according to the fifth embodiment. Compared to the external device 600 according to the fourth embodiment, the external device 600A is different from the external device 600 in a fact that the external device 600A has a processing circuit 650A instead of the processing circuit 650 and has a communication device 630A instead of the communication device 630.

Compared to the communication device 630, the communication device 630A is different from the communication device 630 in a fact that the communication device 630A has a short-range connection section 632A instead of the short-range connection section 632. The communication device 630A receives the first information D1 and the second information D2 by short-range communication with the liquid discharge device 100B. That is, the communication device 630A functions as a short-range connection section 632A that is communicably connected to the liquid discharge device 100B. The communication device 630A may be integrated with the processing circuit 650A.

Compared to the processing circuit 650, the processing circuit 650A is different from the processing circuit 650 in a fact that the processing circuit 650A has an acquisition section 651A instead of the acquisition section 651.

The acquisition section 651A acquires the first information D1 and the second information D2 by communicating with the liquid discharge device 100B using the short-range connection section 632A. The acquisition section 651A stores the acquired first information D1 and second information D2 in the storage circuit 640. The acquisition section 651A is an example of a second acquisition section. The acquisition section 651A may acquire the first information D1 and the second information D2 input from the input device 220.

5-4. Process of Liquid Discharge System

Figure 25:
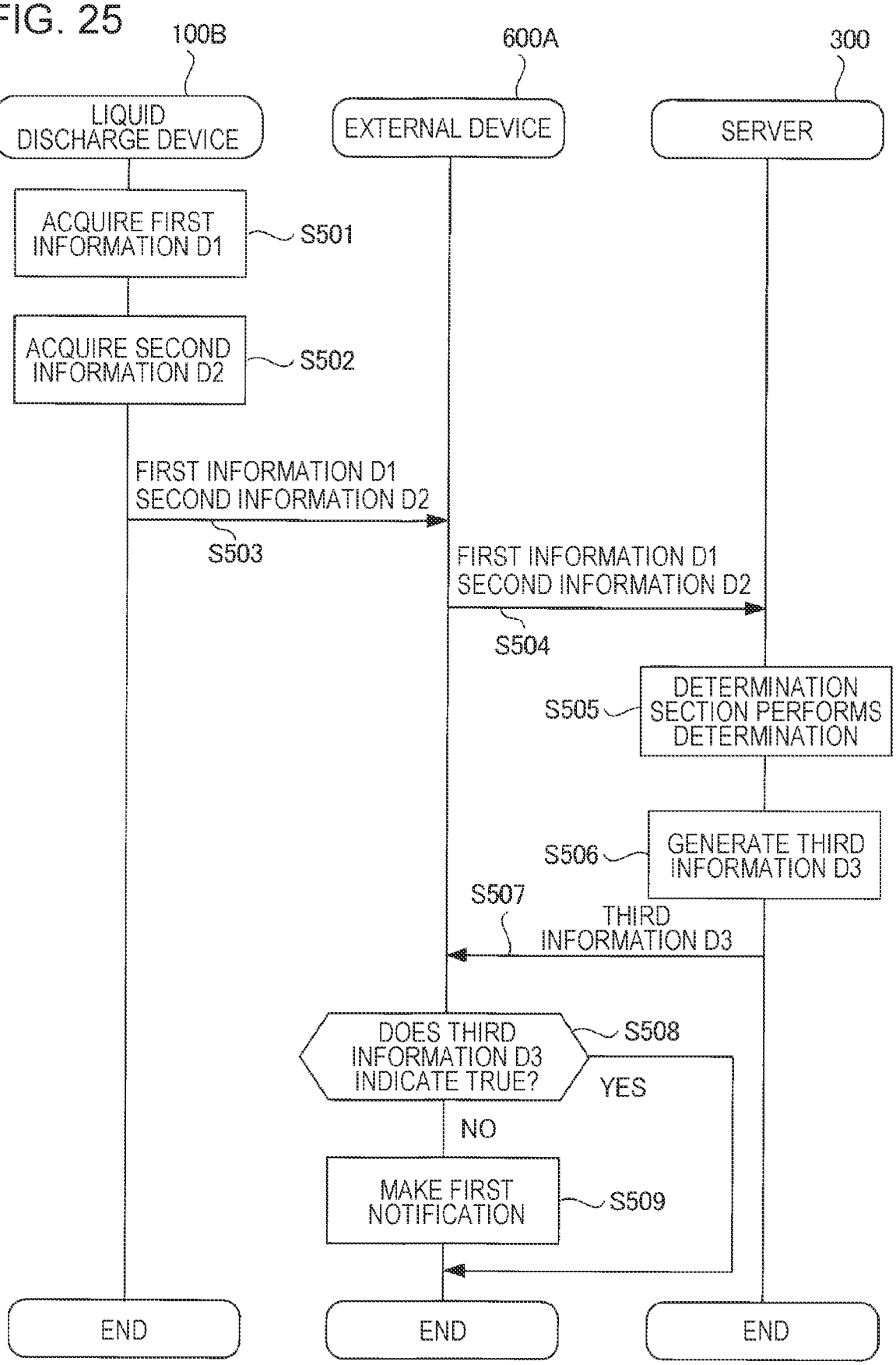
FIG. 25 is a flowchart showing a process of the liquid discharge system according to the fifth embodiment.

FIG. 25 is a flowchart showing the process of the liquid discharge system 10D according to the fifth embodiment.

In step S501, the processing circuit 119A of the liquid discharge device 100B functions as the acquisition section 251 to acquire the first information D1.

In step S502, the processing circuit 119A of the liquid discharge device 100B functions as the acquisition section 251 to acquire the second information D2.

In step S503, the processing circuit 119A of the liquid discharge device 100B functions as the transmission section 252 to transmit the first information D1 and the second information D2 to the external device 600A. After that, the processing circuit 119A of the liquid discharge device 100B ends all the processes. Further, the processing circuit 650A of the external device 600A functions as the acquisition section 651A to acquire the first information D1 and the second information D2.

In step S504, the processing circuit 650A of the external device 600A functions as the transmission section 652 to transmit the first information D1 and the second information D2 to the server 300. Further, the processing circuit 350 of the server 300 functions as the reception section 351 to receive the first information D1 and the second information D2.

In step S505, the processing circuit 350 of the server 300 functions as the determination section 352 to determine whether or not the correspondence relationship between the first information D1 and the second information D2 is stored in the server 300 in advance.

In step S506, the processing circuit 350 of the server 300 functions as the determination section 352 to generate the third information D3 as the determination result.

In step S507, the processing circuit 350 of the server 300 functions as the transmission section 353 to transmit the third information D3 to the external device 600A. After that, the processing circuit 350 of the server 300 ends all the processes. Further, the processing circuit 650A of the external device 600A functions as the reception section 653 to receive the third information D3.

When the third information D3 indicates true, that is, when YES in step S508, the processing circuit 650A of the external device 600A ends all the processes. When the third information D3 indicates false, that is, when NO in step S508, the processing circuit 650A of the external device 600A executes the process of step S509.

In step S509, the processing circuit 650A of the external device 600A functions as the notification section 654 to output the first notification related to the liquid discharge device 100 to the outside of the external device 600A based on the third information D3. After that, the processing circuit 650A of the external device 600A ends all the processes.

5-5. Effect of Liquid Discharge System

The liquid discharge system 10D according to the present embodiment includes the external device 600A. The external device 600A has the connection section 631 that can be connected to the server 300 via the network. In the external device 600A, the transmission section 652 causes the connection section 631 to transmit the first information D1 and the second information D2 to the server 300. The reception section 653 causes the connection section 631 to receive the third information D3 from the server 300.

By having the configuration, the liquid discharge system 10D can directly transmit the first information D1 and the second information D2 to the server 300 from the external device 600A. Further, the external device 600A can directly receive the third information D3 from the server 300.

Further, in the liquid discharge system 10D, short-range wireless communication is possible between the liquid discharge device 100B and the external device 600A. The external device 600A has the acquisition section 651A that acquires the first information D1 via short-range wireless communication.

When the liquid discharge system 10D has the configuration, the external device 600A can acquire the first information D1 from the liquid discharge device 100B by short-range wireless communication.

6. Modification Example

Although the liquid discharge system of the present disclosure has been described based on the illustrated embodiments, the present disclosure is not limited thereto. Further, the configuration of each section of the present disclosure can be replaced with any configuration that exhibits the same function as that of the above-described embodiment, or any configuration can be added.

6-1. First Modification Example

In the liquid discharge system 10A according to the second embodiment, the second processing device 400 outputs the second notification related to the liquid discharge device 100 based on the fifth information D5. For example, the second processing device 400 outputs the second notification indicating that the liquid discharge head 110a used to manufacture the liquid discharge device 100 is not a regular product. However, the notification output by the second processing device 400 is not limited to the second notification.

Figure 26:
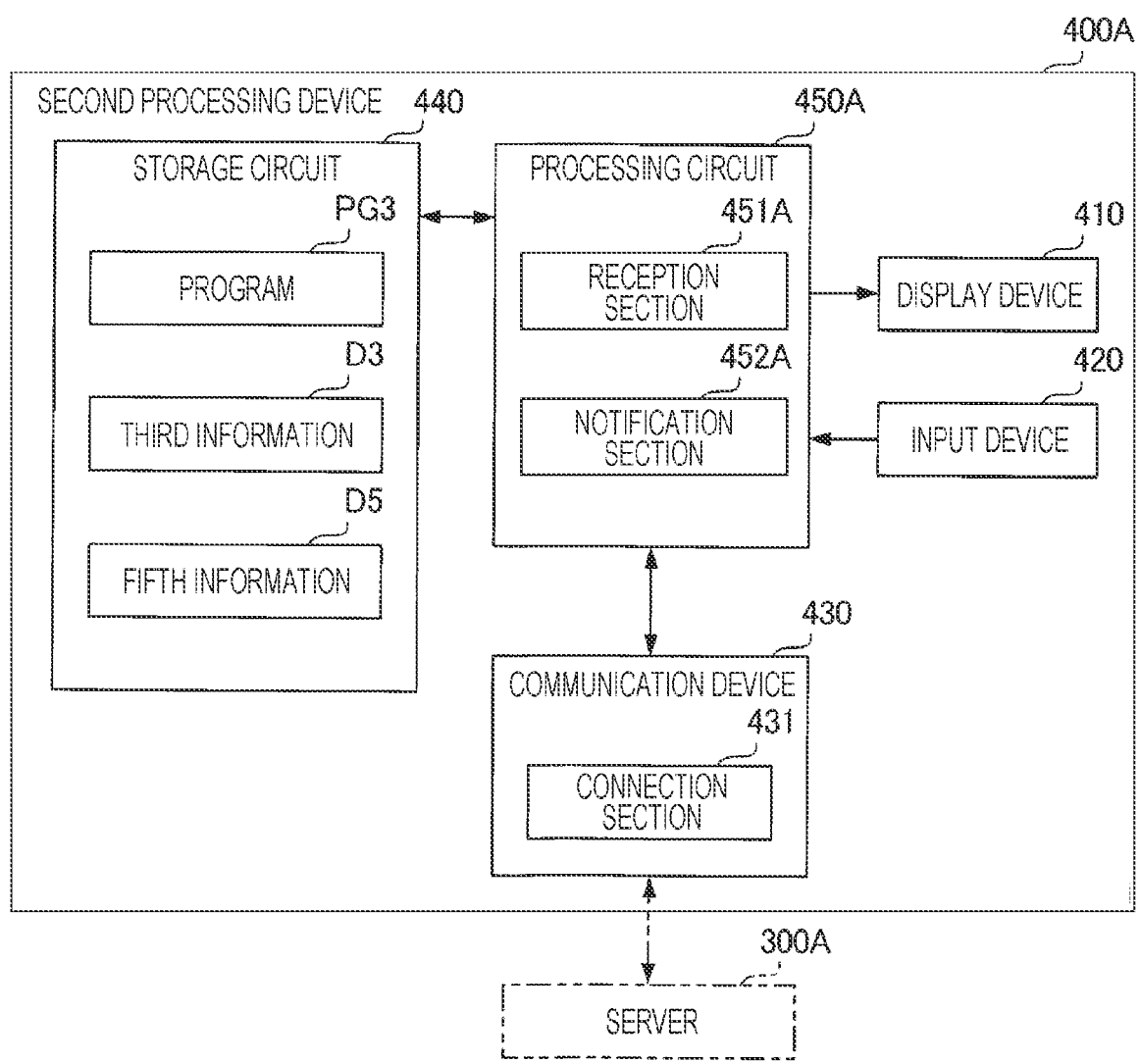
FIG. 26 is a schematic diagram showing a configuration example of a second processing device used in the liquid discharge system according to a modification example.

FIG. 26 is a schematic diagram showing a configuration example of a second processing device 400A provided in place of the second processing device 400 according to the second embodiment in the liquid discharge system according to the present modification example. Compared to the second processing device 400 according to the second embodiment, the second processing device 400A is different from the second processing device 400 in a fact that the storage circuit 440 further stores the third information D3 and the second processing device 400A has a processing circuit 450A instead of the processing circuit 450.

Compared to the processing circuit 450 according to the first embodiment, the processing circuit 450A is different from the processing circuit 450 in a fact the processing circuit 450A has a reception section 451A instead of the reception section 451 and a notification section 452A instead of the notification section 452.

Similar to the reception section 451, the reception section 451A receives the fifth information D5 by communicating with the server 300A using the connection section 431. The reception section 451A stores the received fifth information D5 in the storage circuit 440. Further, the reception section 451A receives the third information D3 by communicating with the server 300A using the connection section 431.

Similar to the notification section 452, the notification section 452A outputs the second notification related to the liquid discharge device 100 to the outside of the second processing device 400 based on the fifth information D5. Further, the notification section 452 outputs the notification related to the liquid discharge device 100 to the outside of the second processing device 400A based on the third information D3. The notification may be, for example, a notification to urge the manufacturer of the liquid discharge device 100 to use the regular liquid discharge head 110a. Alternatively, the notification may be, for example, a notification to prompt the manufacturer of the liquid discharge device 100 to confirm the liquid discharge head 110a used at the time of manufacture. Further, for example, the notification section 254 causes the display device 410 to display the notification by using a display control section (not shown). The notification section 452A is an example of a first notification section. Further, the notification is an example of the first notification.

When the second processing device 400A has the configuration, the second processing device 400A can receive the third information D3. Further, when the manufacturer of the printer as the liquid discharge device 100 has the second processing device 400A, the manufacturer can be urged to use the head as the regular liquid discharge head 110a, or can be prompted to confirm the liquid discharge head 110a used at the time of manufacturing.

6-2. Second Modification Example

In the liquid discharge system 10 according to the first embodiment, it is assumed that the liquid discharge device 100 and the first processing device 200 are separate from each other and are connected to be communicable with each other in a wireless or wired manner. However, the liquid discharge device 100 and the first processing device 200 may have a configuration in which one is incorporated in the other in a single housing. The same applies to the liquid discharge system 10A according to the second embodiment to the liquid discharge system 10D according to the fifth embodiment.

6-3. Third Modification Example

In the liquid discharge system 10 according to the first embodiment, the acquisition section 251 of the first processing device 200 acquires the first information D1 and the second information D2 from the liquid discharge device 100, but a method for acquiring the first information D1 and the second information D2 is not limited thereto. For example, the acquisition section 251 may acquire at least one of the first information D1 and the second information D2 based on input from the input device 220 by the user of the liquid discharge device 100. The same applies to the liquid discharge system 10A according to the second embodiment to the liquid discharge system 10D according to the fifth embodiment.

6-4. Fourth Modification Example

In the liquid discharge system 10C according to the fourth embodiment, the external device 600 acquires the first information D1 and the second information D2 from the first processing device 200C by short-range wireless communication. Alternatively, the external device 600 has acquired the first information D1 and the second information D2 by the input using the display device 610 and the input device 620 by the user of the external device 600. However, a method for acquiring the first information D1 and the second information D2 by the external device 600 is not limited thereto. For example, the external device 600 may acquire the first information D1 and the second information D2 by reading a QR code attached to the housing of the liquid discharge device 100B and the liquid discharge head 110a and a QR code displayed on the display device 210 included in the first processing device 200B by an image pickup device (not shown) included in the external device 600. The same applies to the liquid discharge system 10D according to the fifth embodiment. The QR code is a registered trademark.

6-5. Fifth Modification Example

In the liquid discharge system 10 according to the first embodiment, when the user of the liquid discharge device 100 inputs a transmission instruction from the input device 220, the transmission section 252 of the first processing device 200 causes the connection section 231 to immediately transmit the first information D1 and the second information D2 to the server 300. However, a method for transmitting the first information D1 and the second information D2 is not limited thereto. For example, when the transmission instruction is input from the input device 220, the liquid discharge device 100 transmits the account information of the user of the liquid discharge device 100 and the password used for user authentication to the server 300 via the first processing device 200. When the user is authenticated in the server 300 using the account information and the password, the server 300 transmits a signal for permitting transmission of the first information D1 and the second information D2 to the liquid discharge device 100 via the first processing device 200. After that, the liquid discharge device 100 transmits the first information D1 and the second information D2 to the server 300 using the reception of the signal as a trigger. The method for transmitting the first information D1 and the second information D2 may be the above method.

6-6. Sixth Modification Example

In the liquid discharge system 10 according to the first embodiment, the notification section 254 of the first processing device 200 makes the first notification. In the first embodiment, as shown in the eleventh row of the table shown in FIG. 5, when the true determination results are overlapped a plurality of times, the notification section 254 makes the first notification indicating that the third information D3 is "NG". However, the embodiment of the present disclosure is not limited to an aspect in which the notification section 254 makes the first notification. For example, when true determination results are overlapped a plurality of times, the notification section 254 may make a third notification which is different from the first notification. The third notification may indicate the same content as the first notification indicating that the third information D3 is "NG". Alternatively, the third notification may indicate content different from the content of the first notification.

As an example, the third information D3 may be information indicating only whether or not the correspondence relationship between the first information D1 and the second information D2 matches the correspondence relationship between the serial number of the regular liquid discharge head 110a and the code indicating the manufacturer name of the liquid discharge device 100. In addition, although the third information D3 itself is true, the third notification may indicate that, since an event that the third information D3 is true is repeated a plurality of times, the determination result itself by the determination section 352 is "NG".

When the liquid discharge system 10 has the configuration and when, for the second printer, which is manufactured by the same manufacturer as the first printer installed with the head that is the regular product and which is installed with the head that is the non-regular product, a set of the first information D1 and the second information D2, which is the same as that of the first printer, is input to the determination section 352 of the server 300, the notification section 254 can make the third notification.

6-7. Seventh Modification Example

In the liquid discharge system 10C according to the fourth embodiment, the external device 600 outputs the first notification based on the third information D3, but a subject that outputs the first notification is not limited to the external device 600. For example, the first processing device 200C may acquire the third information D3 from the external device 600, thereby making the first notification based on the third information D3. The same applies to the liquid discharge system 10D according to the fifth embodiment.

6-8. Eighth Modification Example

In the liquid discharge system 10D according to the fifth embodiment, the external device 600A has acquired the first information D1 and the second information D2 by performing short-range wireless communication with the communication device 130B included in the liquid discharge device 100B. However, a communication method between the external device 600A and the liquid discharge device 100B is not limited thereto. For example, when the head unit 110 provided in the liquid discharge device 100B includes a communication device capable of performing short-range radio communication independent of the communication device 130B, the external device 600A may acquire the first information D1 stored in the storage circuit 113.

What is claimed is:

1. A liquid discharge system, comprising:
a liquid discharge device on which a liquid discharge head that discharges a liquid is mounted;
a first processing device that is coupled to the liquid discharge device and generates recording data used to perform a discharge operation of the liquid discharge head in the liquid discharge device; and
a server that is configured to be connected to a network, wherein
a first acquisition section that acquires first information unique to the liquid discharge head and second information related to the liquid discharge device is included,
a first transmission section that transmits the first information and the second information, which are acquired by the first acquisition section, to the server via network connection is included,
a first reception section that receives the first information and the second information via network connection is included in the server,
a determination section that determines whether or not correspondence relationship between the first information and the second information is stored in the server in advance is included in the server,
a second transmission section that transmits third information related to a determination result of the determination section from the server via network connection is included,
a second reception section that receives the third information via network connection is included, and
a first notification section that makes, based on the third information received by the second reception section, a first notification to outside is included.

2. The liquid discharge system according to claim 1, wherein
the liquid discharge device has a first connection section configured to be connected to the server via a network,
the first transmission section causes the first connection section to transmit the first information and the second information to the server, and
the second reception section causes the first connection section to receive the third information from the server.

3. The liquid discharge system according to claim 1, wherein
the first processing device has a first connection section configured to be connected to the server via a network,
the first transmission section causes the first connection section to transmit the first information and the second information to the server, and
the second reception section causes the first connection section to receive the third information from the server.

4. The liquid discharge system according to claim 1, further comprising:
an external device that is different from the liquid discharge device and the first processing device, wherein
the external device has a first connection section configured to be connected to the server via a network,
the first transmission section causes the first connection section to transmit the first information and the second information to the server, and
the second reception section causes the first connection section to receive the third information from the server.

5. The liquid discharge system according to claim 4, wherein
in the liquid discharge device, the first processing device, or the liquid discharge head, a code corresponding to the first information is displayed, and
the external device further has a second acquisition section that acquires the first information by reading the code.

6. The liquid discharge system according to claim 4, wherein
the liquid discharge device, the first processing device, or the liquid discharge head are configured to perform short-range wireless communication with the external device, and
the external device further has a second acquisition section that acquires the first information via short-range wireless communication.

7. The liquid discharge system according to claim 1, wherein
the first notification includes a notification to urge a user of the liquid discharge device to use a regular liquid discharge head.

8. The liquid discharge system according to claim 1, wherein
the first notification includes a notification to prompt a user of the liquid discharge device to make an inquiry to a manufacturer of the liquid discharge device.

9. The liquid discharge system according to claim 1, wherein
a function execution section that causes the liquid discharge device to perform, based on fourth information, a predetermined function is further included,
the second transmission section transmits the fourth information from the server via network connection, and
the second reception section receives the fourth information from the server via network connection.

10. The liquid discharge system according to claim 9, wherein
when the determination section determines that the correspondence relationship between the first information and the second information is not stored in the server in advance, the function execution section does not permit the liquid discharge device to perform the predetermined function.

11. The liquid discharge system according to claim 1, wherein
a third transmission section is further included that transmits fifth information for causing a second processing device different from the liquid discharge head, the liquid discharge device, and the first processing device to make a second notification via network connection when the determination section determines that the correspondence relationship between the first information and the second information is not stored in the server in advance.

12. The liquid discharge system according to claim 11, wherein
the second notification includes a notification indicating that the liquid discharge head used by a manufacturer of the liquid discharge device to manufacture the liquid discharge device is not a regular product.

13. The liquid discharge system according to claim 1, further comprising:
   a third processing device that is connected to the server via a network.

14. The liquid discharge system according to claim 13, wherein
   the third processing device has an updating section that updates the correspondence relationship between the first information and the second information stored in the server.

15. The liquid discharge system according to claim 13, wherein
   the third processing device has an external storage section,
   when the determination section determines that the correspondence relationship between the first information and the second information is not stored in the server in advance, the external storage section stores the second information, and
   when the determination section determines that the correspondence relationship between the first information and the second information is stored in the server in advance, the external storage section does not store the second information.

16. The liquid discharge system according to claim 1, wherein
   when the determination section determines that the correspondence relationship between the first information and the second information is stored in the server in advance and determines that the correspondence relationship is stored in the server in advance a plurality of times, the first notification section makes a third notification.

17. The liquid discharge system according to claim 1, wherein
   a display control section that causes a display device to display a display for causing a user of the liquid discharge device to input the first information and the second information is further included,
   the acquisition section acquires, based on the input, the first information and the second information.

18. The liquid discharge system according to claim 1, wherein
the first information is a serial number of the liquid discharge head.

19. The liquid discharge system according to claim 1, wherein
the second information is at least one of a manufacturer name and a product number of the liquid discharge device.

20. A liquid discharge system, comprising:
a liquid discharge device on which a liquid discharge head that discharges a liquid is mounted;
a first processing device that is coupled to the liquid discharge device and generates recording data used to perform a discharge operation of the liquid discharge head in the liquid discharge device;
a server that is configured to be connected to a network; and
a second processing device that is connected to the server via the network, wherein
a first acquisition section that acquires first information unique to the liquid discharge head and second information related to the liquid discharge device is included,
a first transmission section that transmits the first information and the second information, which are acquired by the first acquisition section, to the server via network connection is included,
a first reception section that receives the first information and the second information via network connection is included in the server,
a determination section that determines whether or not correspondence relationship between the first information and the second information is stored in the server in advance is included in the server,
a second transmission section that transmits third information related to a determination result of the determination section from the server via network connection is included,
a second reception section that receives the third information via network connection is included in the second processing device, and
a first notification section that makes, based on the third information received by the second reception section, a first notification to outside of the second processing device is included in the second processing device.

* * * * *